US012551596B2

(12) United States Patent
Neff et al.

(10) Patent No.: US 12,551,596 B2
(45) Date of Patent: Feb. 17, 2026

(54) DELIVERY SYSTEMS FOR ADMINISTRATION OF CATIONIC BIOLOGICAL ACTIVES

(71) Applicant: Allvivo Vascular, Inc., Lake Forest, CA (US)

(72) Inventors: Jennifer A Neff, Rancho Santa Margarita, CA (US); Danir Franisovich Bayramov, Irvine, CA (US); Zhenghao Li, Palo Alto, CA (US); Esha A Patel, Irvine, CA (US)

(73) Assignee: Allvivo Vascular, Inc., Lake Forest, CA (US)

( * ) Notice: Subject to any disclaimer, the term of this patent is extended or adjusted under 35 U.S.C. 154(b) by 1180 days.

(21) Appl. No.: 16/760,898

(22) PCT Filed: Oct. 30, 2018

(86) PCT No.: PCT/US2018/058298
§ 371 (c)(1),
(2) Date: Apr. 12, 2021

(87) PCT Pub. No.: WO2019/089657
PCT Pub. Date: May 9, 2019

(65) Prior Publication Data
US 2022/0016308 A1      Jan. 20, 2022

Related U.S. Application Data

(60) Provisional application No. 62/579,118, filed on Oct. 30, 2017.

(51) Int. Cl.
| A61L 15/26 | (2006.01) |
| A61L 15/24 | (2006.01) |
| A61L 15/28 | (2006.01) |

(52) U.S. Cl.
CPC ............... *A61L 15/26* (2013.01); *A61L 15/24* (2013.01); *A61L 15/28* (2013.01); *A61L 2300/206* (2013.01); *A61L 2300/208* (2013.01); *A61L 2300/214* (2013.01); *A61L 2300/236* (2013.01); *A61L 2300/252* (2013.01)

(58) Field of Classification Search
None
See application file for complete search history.

(56) References Cited

U.S. PATENT DOCUMENTS

| 5,656,591 | A  | 8/1997  | Tomita et al.     |
| 6,835,713 | B2 | 12/2004 | Montellaro et al. |
| 6,887,847 | B2 | 5/2005  | Montellaro et al. |
| 8,071,540 | B2 | 12/2011 | Montellaro et al. |
| 8,138,144 | B2 | 3/2012  | Krieger et al.    |
| 8,263,101 | B2 | 9/2012  | Owens et al.      |
| 8,343,717 | B2 | 1/2013  | Owens et al.      |
| 8,466,102 | B2 | 6/2013  | Krieger et al.    |
| 8,809,277 | B2 | 8/2014  | Xu et al.         |
| 8,927,487 | B2 | 1/2015  | Krieger et al.    |
| 9,220,259 | B2 | 12/2015 | Owens et al.      |
| 9,227,999 | B2 | 1/2016  | Krieger et al.    |
| 2002/0169279 | A1 | 11/2002 | Montelaro et al. |
| 2002/0188102 | A1 | 12/2002 | Montelaro et al. |
| 2009/0181157 | A1 | 7/2009  | Toreki et al.    |
| 2010/0094230 | A1 | 4/2010  | Dujardin et al.  |
| 2015/0118315 | A1 | 4/2015  | Wilson           |
| 2015/0209343 | A1 | 7/2015  | Lu et al.        |
| 2015/0343014 | A1 | 12/2015 | Lefevre et al.   |

FOREIGN PATENT DOCUMENTS

WO      2009012143 A2      1/2009

OTHER PUBLICATIONS

Piras, A.M., et al., Chitosan nanoparticles loaded with the antimicrobial peptide temporin B exert a long-term antibacterial activity in vitro against clinical isolates of *Staphylococcus epidermidis*, Front. Microbiol. 6:372. doi: 10.3389/fmicb.2015.00372 (2015); see Aug. 3, 2024 IDS (Year: 2015).*

Miranda, R., et al., Efficiency of Chitosans for The Treatment of Papermaking Process Water by Dissolved Air Flotation, Chemical Engineering Journal • Sep. 2013 DOI: 10.1016/j.cej.2013.07.033 (Year: 2013).*

Kang et al., "De novo generation of antimicrobial LK peptides with a single tryptophan at the critical amphipathic Interface", J Pept Sci, (Jun. 19, 2009), vol. 15, No. 9, pp. 583-588.

Nguyen et al., "Investigating the cationic side chains of the antimicrobial peptide tritrpticin: hydrogen bonding properties govern its membrane-disruptive activities", Biochim Biophys Acta, (2011), vol. 1808, No. 9, pp. 2297-2303.

Delouches et al., "De Novo Generation of Cationic Antimicrobial Peptides: Influence of Length and Tryptophan Substitution on Antimicrobial Activity," Antimicrobial Agents and Chemotherapy, Jan. 2005, vol. 49, No. 1, pp. 316-322.

(Continued)

*Primary Examiner* — H. Sarah Park
(74) *Attorney, Agent, or Firm* — Kristin C. Hübner; Hübner Law

(57) ABSTRACT

A Delivery System for delivery of an Active Component is provided. The Delivery System comprises a Delivery Matrix and an Active Component. The Delivery Matrix has one or both of (i) a Cationic Component; and (ii) a Matrix Forming Substance. The Cationic Component has one or both of: (i) a cationic polymer or cationic copolymer, and (ii) a positively charged non-polymeric compound or composition. The Active Component comprises a cationic bioactive. The Delivery Matrix has a mEq amount of positive charge which is equal to or exceeds the mEq amount of positive charge of the Active Component. The Delivery Matrix may comprise chitosan, or other biopolymers, synthetic polymers, matrix polymers and large molecules, which themselves are matrix forming, or are combined with a Matrix Forming Substance and one or more other Cationic Components to form the positively charged Delivery Matrix.

35 Claims, 3 Drawing Sheets
Specification includes a Sequence Listing.

(56) References Cited

OTHER PUBLICATIONS

Delouches et al., "De novo-derived cationic antimicrobial peptide activity in a murine model of Pseudomonas aeruginosa bacteraemia," J. Antimicrobial Chemotherapy (2007) vol. 60, pp. 669-672.
International Search Report and Written Opinion; PCT/US2018/058298; Feb. 19, 2019.
Extended European Search Report; EP18874469.2; Dec. 13, 2021.
Cado et al: "Self-defensive biomaterial coating against bacteria and yeasts: Polysaccharide multilayer film with embedded antimicrobial peptide". Advanced Functiona Materials. vol. 23. Jan. 1, 2013 (Jan. 1, 2013). pp. 4801-4809. XP055868353.
Ce Nisia et al: "Antimicrobial activity of chitosan films containing nisin, peptide P34, and natamycin". CYTA—Journal of Food. vo 1 • 10. No. 1. Feb. 1, 2012 (Feb. 1, 2012). pp. 21-26. XP055868348.
Piras Anna M. et al: "Chitosan nanoparticles loaded with the antimicrobial peptide temporin B exert a long-term antibacterial activity in vitro against clinical isolates of *Staphylococcus epidermidis*", Frontiers in Microbiology. vol. 06. Apr. 28, 2015 (Apr. 28, 2015). XP055867962.
Yu Kai et al: "Anti-adhesive antimicrobial peptide coating prevents catheter associated infection in a mouse urinary infection model", Biomaterials. Elsevier. Amsterdam. NL, vol. 116. Nov. 24, 2016 (Nov. 24, 2016). pp. 69-81. XP029845512.

\* cited by examiner

SEQUENCE LISTING

<160> NUMBER OF SEQ ID NOS: 17

<210> SEQ ID NO 1
<211> LENGTH: 28
<212> TYPE: PRT
<213> ORGANISM: Artificial Sequence
<220> FEATURE:
<223> OTHER INFORMATION: Antimicrobial peptide

<400> SEQUENCE: 1

Arg Val Ile Arg Val Val Gln Arg Ala Cys Arg Ala Ile Arg His Ile
1               5                   10                  15

Val Arg Arg Ile Arg Gln Gly Leu Arg Arg Ile Leu
            20                  25

```
<210> SEQ ID NO 2
<211> LENGTH: 31
<212> TYPE: PRT
<213> ORGANISM: Artificial Sequence
<220> FEATURE:
<223> OTHER INFORMATION: Antimicrobial Peptide

<400> SEQUENCE: 2

Arg Val Ile Arg Val Val Gln Arg Ala Cys Arg Ala Ile Arg His Ile
1               5                   10                  15

Val Arg Arg Ile Arg Gln Gly Leu Arg Arg Ile Leu Arg Val Val
            20                  25                  30

<210> SEQ ID NO 3
<211> LENGTH: 31
<212> TYPE: PRT
<213> ORGANISM: Artificial Sequence
<220> FEATURE:
<223> OTHER INFORMATION: Antimicrobial Peptide

<400> SEQUENCE: 3

Arg Trp Ile Arg Val Val Gln Arg Trp Cys Arg Ala Ile Arg His Ile
1               5                   10                  15

Trp Arg Arg Ile Arg Gln Gly Leu Arg Arg Trp Leu Arg Val Val
            20                  25                  30

<210> SEQ ID NO 4
<211> LENGTH: 12
<212> TYPE: PRT
<213> ORGANISM: Artificial Sequence
<220> FEATURE:
<223> OTHER INFORMATION: Antimicrobial peptide

<400> SEQUENCE: 4

Arg Val Val Arg Val Val Arg Arg Val Val Arg Arg
1               5                   10

<210> SEQ ID NO 5
<211> LENGTH: 24
<212> TYPE: PRT
<213> ORGANISM: Artificial Sequence
<220> FEATURE:
<223> OTHER INFORMATION: Antimicrobial Peptide

<400> SEQUENCE: 5

Arg Arg Val Val Arg Arg Val Arg Arg Val Val Arg Arg Val Val Arg
1               5                   10                  15

Val Val Arg Arg Val Val Arg Arg
            20

<210> SEQ ID NO 6
<211> LENGTH: 36
<212> TYPE: PRT
<213> ORGANISM: Artificial Sequence
<220> FEATURE:
<223> OTHER INFORMATION: Antimicrobial peptide

<400> SEQUENCE: 6

Val Arg Arg Val Val Arg Arg Val Val Arg Val Val Arg Arg Val Val
1               5                   10                  15

Arg Arg Val Arg Arg Val Val Arg Arg Val Val Arg Val Val Arg Arg
            20                  25                  30

Val Val Arg Arg
        35
```

```
<210> SEQ ID NO 7
<211> LENGTH: 42
<212> TYPE: PRT
<213> ORGANISM: Artificial Sequence
<220> FEATURE:
<223> OTHER INFORMATION: Antimicrobial Peptide

<400> SEQUENCE: 7

Arg Arg Val Val Arg Val Arg Arg Val Val Arg Arg Val Arg
1               5                   10                  15

Val Val Arg Arg Val Val Arg Arg Val Val Arg Arg Val Arg Val
            20                  25                  30

Val Arg Val Val Arg Arg Val Val Arg Arg
        35                  40

<210> SEQ ID NO 8
<211> LENGTH: 48
<212> TYPE: PRT
<213> ORGANISM: Artificial Sequence
<220> FEATURE:
<223> OTHER INFORMATION: Antimicrobial peptide

<400> SEQUENCE: 8

Arg Val Val Arg Val Arg Arg Val Val Arg Arg Val Arg Val
1               5                   10                  15

Val Arg Arg Val Val Arg Val Val Arg Arg Val Val Arg Val Arg
            20                  25                  30

Arg Val Val Arg Arg Val Val Arg Val Val Arg Arg Val Val Arg Arg
        35                  40                  45

<210> SEQ ID NO 9
<211> LENGTH: 12
<212> TYPE: PRT
<213> ORGANISM: Artificial Sequence
<220> FEATURE:
<223> OTHER INFORMATION: Antimicrobial peptide

<400> SEQUENCE: 9

Arg Val Val Arg Val Val Arg Arg Trp Val Arg Arg
1               5                   10

<210> SEQ ID NO 10
<211> LENGTH: 24
<212> TYPE: PRT
<213> ORGANISM: Artificial Sequence
<220> FEATURE:
<223> OTHER INFORMATION: Antimicrobial peptide

<400> SEQUENCE: 10

Arg Arg Trp Val Arg Arg Val Arg Arg Val Trp Arg Arg Val Val Arg
1               5                   10                  15

Val Val Arg Arg Trp Val Arg Arg
            20

<210> SEQ ID NO 11
<211> LENGTH: 36
<212> TYPE: PRT
<213> ORGANISM: Artificial Sequence
<220> FEATURE:
<223> OTHER INFORMATION: Antimicrobial peptide

<400> SEQUENCE: 11

Val Arg Arg Val Trp Arg Arg Val Val Arg Val Val Arg Arg Trp Val
1               5                   10                  15
```

Arg Arg Val Arg Val Trp Arg Val Val Arg Val Arg Arg
            20                  25                  30

Trp Val Arg Arg
        35

<210> SEQ ID NO 12
<211> LENGTH: 48
<212> TYPE: PRT
<213> ORGANISM: Artificial Sequence
<220> FEATURE:
<223> OTHER INFORMATION: Antimicrobial peptide

<400> SEQUENCE: 12

Arg Val Val Arg Val Val Arg Trp Val Arg Arg Val Arg Val
1               5                   10                  15

Trp Arg Arg Val Val Arg Val Val Arg Arg Trp Val Arg Val Arg
            20                  25                  30

Arg Val Trp Arg Arg Val Val Arg Val Val Arg Arg Trp Val Arg Arg
        35                  40                  45

<210> SEQ ID NO 13
<211> LENGTH: 6
<212> TYPE: PRT
<213> ORGANISM: Artificial Sequence
<220> FEATURE:
<223> OTHER INFORMATION: Antimicrobial peptide

<400> SEQUENCE: 13

Arg Arg Trp Trp Arg Arg
1               5

<210> SEQ ID NO 14
<211> LENGTH: 12
<212> TYPE: PRT
<213> ORGANISM: Artificial Sequence
<220> FEATURE:
<223> OTHER INFORMATION: Antimicrobial peptide

<400> SEQUENCE: 14

Arg Trp Trp Arg Trp Trp Arg Arg Trp Trp Arg Arg
1               5                   10

<210> SEQ ID NO 15
<211> LENGTH: 18
<212> TYPE: PRT
<213> ORGANISM: Artificial Sequence
<220> FEATURE:
<223> OTHER INFORMATION: Antimicrobial peptide

<400> SEQUENCE: 15

Trp Arg Arg Trp Trp Arg Arg Trp Trp Arg Trp Trp Arg Arg Trp Trp
1               5                   10                  15

Arg Arg

<210> SEQ ID NO 16
<211> LENGTH: 24
<212> TYPE: PRT
<213> ORGANISM: Artificial Sequence
<220> FEATURE:
<223> OTHER INFORMATION: Antimicrobial peptide

<400> SEQUENCE: 16

Arg Arg Trp Trp Arg Arg Trp Arg Arg Trp Trp Arg Arg Trp Trp Arg
1               5                   10                  15

```
Trp Trp Arg Arg Trp Trp Arg Arg
            20

<210> SEQ ID NO 17
<211> LENGTH: 24
<212> TYPE: PRT
<213> ORGANISM: Artificial Sequence
<220> FEATURE:
<223> OTHER INFORMATION: Antimicrobial peptide

<400> SEQUENCE: 17

Arg Arg Trp Val Arg Arg Val Arg Arg Trp Val Arg Arg Val Val Arg
1               5                   10                  15

Val Val Arg Arg Trp Val Arg Arg
            20
```

DELIVERY SYSTEMS FOR ADMINISTRATION OF CATIONIC BIOLOGICAL ACTIVES

This Application is a Continuation of and claims the benefit of PCT Application Number PCT/US2018/58298, filed on Oct. 30, 2018, which claims the benefit of U.S. Provisional Patent Application No. 62/579,118, filed on Oct. 30, 2017, the entire content of the foregoing applications are incorporated by reference in their entirety.

FIELD OF THE INVENTION

The current invention relates to methods of creating compositions suitable for efficient local delivery of cationic amphiphilic biologically active compounds. Compositions and methods described herein are suitable for efficient delivery of cationic molecules possessing an excess of positively charged moieties at charge density≥1 mEq/g, in particular, such molecules comprise amphiphilic cationic antimicrobial peptides, their synthetic analogues and mimetics that are active against infectious organisms. The delivery systems in particular are suitable for local application in the forms of liquids, gels, creams, ointments, suppositories, foams, sprays, and dressings to treat or prevent wound infection. The delivery systems can also be applied in the form of coatings or films on medical devices to prevent pathogen colonization of medical device surfaces and infection of surrounding body tissues.

BACKGROUND

Due to rapid development of bacterial resistance to contemporary antibiotics and antimicrobials there is a need for new anti-infective therapies. Naturally occurring cationic amphiphilic anti-microbial peptides (AMPs) or their synthetic analogues as well as cationic peptide mimetic molecules have received attention as excellent candidates for novel anti-infective topical and local therapies because of their generally broad range of anti-microbial activity, usually fast bactericidal kinetics and vast selection of molecules with desired activities.

Appropriate selection of an antimicrobial molecule suitable for treatment of a specific infection condition may not be sufficient alone for the success of the therapy without providing appropriate delivery system. An efficient delivery composition must ensure release of antimicrobial molecules to the target site at concentrations above the minimum effective concentrations and maintain the effective concentrations over a period of time sufficient to kill the infection. It is widely recognized that antimicrobial resistance and tolerance to antibiotics is exacerbated by the fact that the majority of infectious diseases and wound related infections are associated with microbial biofilms comprising polymicrobial communities enclosed within a self-produced extracellular polymeric substance (EPS). Tolerance associated with biofilm formation has been shown to increase the concentration of antibiotics required for bacteria inhibition by one to three orders in magnitude as compared to concentrations that are effective in vitro against planktonic bacteria. Thus, to insure effective therapeutic antimicrobial doses at physiological conditions over effective period of time a delivery system is required with high or near full recovery of an antimicrobial. High recovery of AMPs is also dependant on stability of peptides in the delivery system both during storage and at conditions of product application. Furthermore, AMPs may be expensive to produce, necessitating efficient delivery to prevent the need to load products with excess antimicrobial and maintain affordable material costs.

A number of antimicrobial compositions utilizing antimicrobial peptides, their synthetic analogues and peptide mimetics have been described. For example, U.S. Pat. No. 5,656,591 describes antimicrobial compositions comprising one or more of antimicrobial peptides derived from lactoferrins, and one or more of ingredients present in amounts sufficient to increase the antimicrobial effects of the antimicrobial peptide. US Patent Application No. 2015/0343014 A1 discloses topical antimicrobial dermatological compositions. U.S. Pat. Nos. 8,138,144; 8,466,102; 8,927,487; and 9,227,999 disclose gel compositions comprising an antimicrobial peptide, a viscosity-increasing agent and a solvent. U.S. Pat. Nos. 8,263,101; 8,343,717; and 9,220,259 describe anti-microbial collagen-based acellular tissue matrices incorporating anti-microbial agents that form a stable bond with the tissue matrices. U.S. Pat. No. 8,809,277 describes a delivery system for melittin, an amphipathic alpha-helical cationic peptide used to treat cancer cells. US Patent Application No. 2015/0118315 A1 describes a finished pharmaceutical product adapted for oral delivery of an aromatic-cationic peptide.

SUMMARY

According to the present invention, a Delivery System for delivery of an Active Component is provided. The Delivery System combines a positively charged Delivery Matrix with a positively charged Active Component having at least one bioactive cationic compound or composition. The Delivery Matrix has a mEq amount of positive charge which is equal to or exceeds the mEq amount of positive charge of the Active Component. The Delivery Matrix has one or both of (i) a Cationic Component; and (ii) a Matrix Forming Substance. The Cationic Component has one or both of: (i) a cationic polymer or cationic copolymer, and (ii) a positively charged non-polymeric compound or composition, such that the Delivery Matrix has an excess positive charge with a concentration (density) of positive charge which is ≥1 mEq/g of material in the Delivery Matrix. In some embodiments, the Cationic Component has sufficient matrix forming properties such that an additional Matrix Forming Substance is not included in the Delivery Matrix. In other embodiments, a Matrix Forming Substance is combined with one or more Cationic Components to form the Delivery Matrix, as described herein. The Active Component has at least one bioactive cationic compound or composition, and comprises an excess positive charge with a concentration (density) of positive charge which is ≥1 mEq/g of the Active Component. The Delivery Matrix has a mEq amount of positive charge which is equal to or exceeds the mEq amount of positive charge of the Active Component. In certain preferred embodiments, the Delivery Matrix comprises chitosan, or other biopolymers, synthetic polymers, matrix polymers and large molecules, which themselves are matrix forming, alone, or in combination with other cationic components or Matrix Forming Substances. In other preferred embodiments, a Matrix Forming Substance is combined with one or more other Cationic Components to form the positively charged Delivery Matrix. The Delivery System may be in the form of a liquid, gel or foam applied to a bandage, wrap, or other delivery device for application to the body, or a liquid, gel or foam delivered directly to the body, or the Delivery System may be applied to a medical device for delivery of the Active component to a body via the medical device.

The present invention provides systems and methods of creating compositions suitable for incorporating cationic amphiphilic (amphipathic) biologically active compounds to achieve their stability and efficient delivery. In particular, the delivery systems described herein are suitable for efficient delivery of amphiphilic cationic antimicrobial peptides (AMPs), their synthetic analogues and mimetics to a target site to prevent or treat infection. The target site could be a body tissue or a medical device. The most well studied AMPs commonly display an amphipathic (or amphiphilic) conformation having positively charged groups and hydrophobic groups segregated onto opposite faces of an alpha helix, beta-sheet, or other tertiary structure. This structure confers affinity and selectivity for bacteria membranes resulting in binding, membrane disruption, and ultimately bacteria death. However, the unique amphipathic structure of AMPs with spatial segregation of the positively charged moieties and the hydrophobic moieties within the molecule confers AMPs the ability to strongly bind not only to bacteria membranes but also to a broad range of materials and compositions that are used or may be used in drug delivery systems and medical devices. In turn, strong binding of AMPs to drug delivery materials may lead to poor AMP recovery and release from the delivery system which, in turn, will result in the target delivery area being exposed to the AMP at concentrations and/or exposure durations that are insufficient to kill bacteria or prevent bacterial colonization. Poor AMP recovery from a delivery system can also be associated with poor drug stability during storage and/or during exposure to conditions of products application such as body temperature, pH and physiological fluids.

As is known to those of skill in the art, drug recovery from a drug delivery system can be measured in drug release experiments by exposing a drug delivery system to a medium modeling conditions (such as medium pH and temperature) and duration of intended use, followed by assaying the cumulative amount of drug released (recovered) relative to the total amount of drug loaded in the system. Drug stability can be also evaluated during such an experiment by detecting drug degradation products with appropriate methods, such as HPLC. A high recovery (e.g. >50%) is indicative of weak binding of drug to the components of the delivery system and its high availability for release into surrounding medium. To the contrary, low recovery (e.g. <50%) is indicative of strong drug binding to the delivery system materials and poor tendency for release from the system. As is also known to those of skill in the art, high recovery of antimicrobial from the delivery system and strong release positively correlate with anti-microbial efficacy of the system and durability of the anti-microbial effect. The anti-microbial efficacy and anti-microbial durability can be evaluated for example in in vitro experiments by first exposing the drug delivery system to a medium modeling conditions (such as medium pH and temperature) and duration of intended use, followed by challenging the exposed delivery system with bacteria and measuring the relative number of bacteria killed. It is also known to those of skill in the art that higher concentrations of antimicrobials are usually required to kill bacteria in biofilms as opposed to planktonic bacteria. Therefore, an antimicrobial delivery system that is capable of killing planktonic bacteria may not be effective against bacteria in biofilm if the release and recovery of anti-microbial is not high enough to provide antimicrobial concentrations effective against biofilms.

BRIEF DESCRIPTION OF THE DRAWINGS

These and other features, aspects and advantages of the present invention will become better understood from the following description, appended claims, and accompanying figures where:

DETAILED DESCRIPTION

Figure 1:
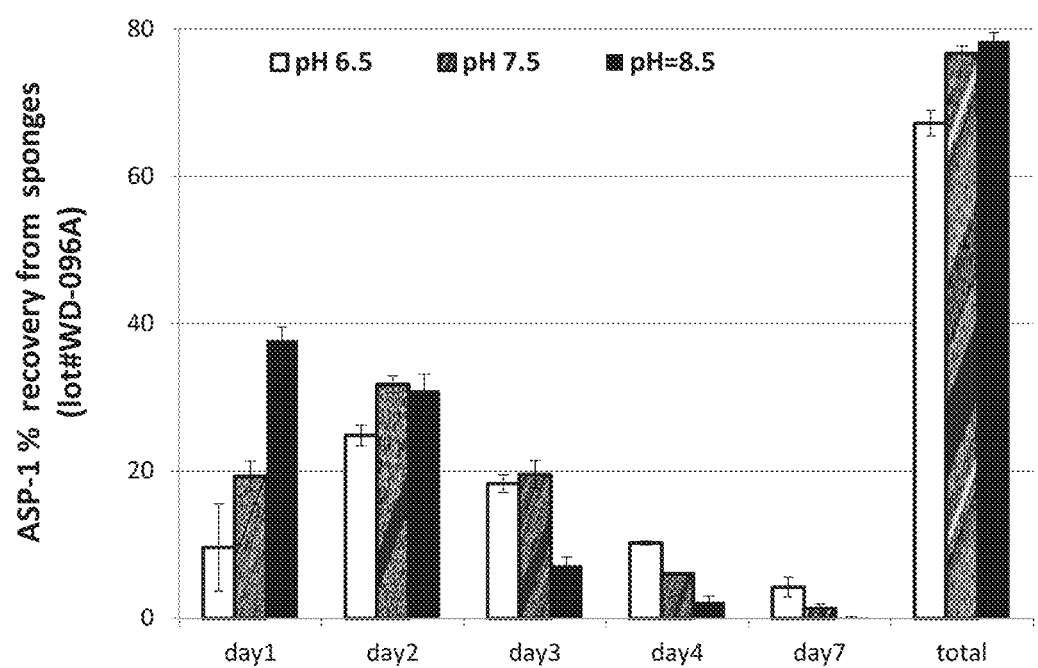
FIG. 1 is a bar graph showing recovery of ASP-1 peptide from chitosan sponges (lot WD-096A) at different pHs, according to one embodiment of the invention.

According to the present invention, it has been found that delivery compositions and systems comprising a Delivery Matrix (also referred to herein as delivery matrices) bearing an excess of positively charged moieties provides efficient and effective delivery of a cationic Active Component, including higher stability, recovery, release and efficacy of the Active Component, including cationic amphiphilic actives such as cationic peptides, analogues of cationic peptides and their mimetics.

The term Delivery Matrix refers to a component of the delivery system comprising all materials except the Active Component. The Delivery Matrix bears the excess positive charge and comprises one or both of a Cationic Component and a Matrix Forming Substance.

The term Cationic Component refers to at least one net positively charged compound or composition selected from the group consisting of one or both of: (i) a cationic polymer or copolymer, and (ii) a non-polymeric molecule having a positive charge, such as a non-polymeric molecule having a positively charged moiety. In some embodiments, the non-polymeric molecule imparts a sufficient amount of excess positive charge to the Delivery Matrix such that the Delivery Matrix has a net positive charge, with, or without another Cationic Component. The Cationic Components, in combination with the Matrix Forming Substance, is capable of supplying a net positive charge to the Delivery Matrix. In some embodiments, the Cationic Components are themselves capable of forming the Delivery Matrix, as they are themselves matrix forming. In this embodiment, an additional Matrix Forming Substance is optional to improve the properties of the Delivery System.

The Matrix Forming Substance may be used in the Delivery Matrix, in combination with the Cationic Component to impart to the delivery system desired physical, rheological, mechanical or other properties such as, for example, the physical state: liquid, gel or solid. The Matrix Forming Substance is typically a neutrally charged compound, or combination of compounds. However, in some embodiments of the invention the Matrix Forming Substance is positively charged.

The Active Component refers to a component having at least one bioactive cationic compound or composition intended for delivery to elicit a therapeutic effect, such as a cationic antimicrobial peptides, analogues of cationic antimicrobial peptides and their mimetics, which are intended to prevent or treat infection, such as preventing pathogen colonization of a site or treating an infected site.

The Delivery Matrix has a mEq amount of positive charge which is equal to or exceeds the mEq amount of positive charge of the Active Component.

According to the present invention, the Cationic Component of the Delivery Matrix comprises an excess positive charge with the density (concentration) of the excess positive charge at 1 mEq/g (milli equivalents per gram) or higher. The excess positive charge density, P, (mEq/g) in a material is defined herein as the density of positive charge, p (mEq/g), minus the density of negative charge, n (mEq/g): P=p−n. In the case where the Cationic Component does not have moieties capable of bearing negative charge, the excess positive charge density P equals p (P=p). As it will be understood by those of skill in the art, the total excess positive charge present in the Delivery System is the sum of positive charge presented by an Active Component and the positive charge donated to the delivery matrix by the Cationic Component, wherein the Active Component comprises at least one cationic moiety, and the Active Component comprises an excess of positive charge at charge density≥1 mEq/g of the Active Component. One aspect of the invention is that in the Delivery System, the mEq amount of positive charge donated to the Delivery Matrix by the Cationic Component is equal or exceeds the mEq amount of positive charge presented by the Active Component. For example, in the delivery system comprising 1% of cationic active with the charge density P=3 mEq/g, the preferred concentration of a Cationic Component with the charge density P=6 mEq/g will be selected in the system at 0.5% or higher to donate the amount of positive charge equal or higher than the charge presented by the active component.

In one embodiment of the invention, one or more of the Cationic Components comprises a cationic polymer or copolymer.

Yet, in another embodiment of the invention, one or more of the Cationic Components comprises a cationic polymer chitosan or a chemically modified chitosan. It is known to those of skill in the art that chitosan is a cationic polymer bearing positively charged D-glucosamine moieties and neutral acetylated D-glucosamine moieties. Chitosan is produced by de-acetylation of naturally occurring chitin polymer comprising in excess neutral N-acetyl-D-glucosamine moieties. Thus the higher degree of de-acetylation (DDA) in chitosan leads to higher density of positive charge. The density of positive charge, p (mEq/g) for chitosans with different DDA can be calculated by dividing mEq (milli mole) amounts of D-glucosamine moieties present in the chitosan molecule over the molecular weight of chitosan (MW, g/mole). Thus, for example, chitosan with DDA=50% has p≈2.7 mEg/g, whereas chitosan with DDA=100% has p≈6.2 mEq/g.

In another embodiment of the invention, one or more of the Cationic Components comprises a cationic copolymer poly(butyl methacrylate, (2-dimethylaminoethyl) methacrylate, methyl methacrylate) (1:2:1) available, for example, under trade name Eudragit® E PO. The density of positive charge in Eudragit® E PO copolymer can be calculated by dividing mEq (milli mole) amounts of the positively charged (2-dimethylaminoethyl) methacrylate moieties present in the copolymer over the molecular weight of the copolymer with the result p≈3.6 mEq/g.

In another embodiment of the invention, one or more of the Cationic Components comprises cationic polymer polyhexamethylene biguanide [PHMB]. The PHMB polymer is available for example in the form of hydrochloride salt with general formula $(C_8H_{17}N_5)_x*HCl_x$, where x is the degree of polymerization. The density of positive charge in the PHMB polymer can be calculated by dividing mEq (milli mole) amounts of the positively charged biguanide moieties present in the polymer over the molecular weight of the polymer: p≈4.6 mEq/g.

In another embodiment of the invention, one or more of the Cationic Components comprises a positively charged naturally occurring biopolymer, positively charged naturally occurring matrix polymer, or a positively charged naturally occurring large molecule. An example of a Cationic Component according to this embodiment is a positively charged collagen.

In another embodiment of the invention, one or more of the Cationic Components comprises amines, alkyl-amines, or quaternary ammonium compounds or compositions, and molecules, compounds, chemicals, polymers or co-polymers having an amine, alkyl-amine or quaternary ammonium moiety, or a 5- or 6-membered aromatic or non-aromatic ring having a positively charged moiety, such as pyridine, piperidine, morpholine, imidazole, diazole, or triazole. Examples include but are not limited to: benzethonium, benzalkonium, cetalkonium stearalkonium, cetyltrimethylammonium, cetylpyridinium, thonzonium, domiphen, lysine, arginine, histidine, allantoin, guanidine, guanidinium salts, biguanide and histamine, and amine containing polymers such as polylysine and polyamine.

In another embodiment of the invention, one or more of the Cationic Components comprises a donor of positively charged proton ions (H+) capable of donating (presenting) proton ions in amounts ≥1 mEq/g of the Cationic Component material. The donor (source) of positively charged proton ions (H+) may be an acid. Examples of suitable acids include but are not limited to: hydrochloric, sulfuric, methanesulfonic, isethionic, phosphoric, acetic, tartaric, lactic, malic, oxalic, succinic, adipic, citric, ethylenediaminetetraacetic, benzoic, benzenesulfonic, tosylic, fumaric, glucoheptonic, pentetic, stearic, palmitic, myristic, lauric, capric, and linoleic.

As it will be understood by those of skill in the art, the Cationic Component can comprise a mixture of two or more cationic substances, such as one or more cationic polymers or copolymers, and one or more non-polymeric molecules having a positive charge (e.g, a positively charged moiety). For example, in one embodiment the Cationic Component comprises cationic polymer and a non-polymeric molecule having a positively charged moiety, such as an acid acting as a donor of positively charged proton ions H+ to the Delivery Matrix. Yet in another embodiment, the Cationic Component comprises a mixture of two acids acting as donors of positively charged proton ions H+ to the Delivery Matrix. Yet in another embodiment, the Cationic Component comprises a mixture of a cationic polymer, an acid and a low molecular weight cationic amino acid such as lysine, arginine or histidine.

According to another embodiment of the invention, the Matrix Forming Substance of the Delivery System comprises a polymer that is essentially neutral in terms of excess charge and does not reduce the mEq amount of positive charge presented by the Delivery Matrix below the mEq amount of positive charge presented by the Active Component in the delivery system. Examples include neutrally charged matrix forming large molecules, polymers or copolymers, non-ionic matrix forming large molecules, polymers or copolymers, and low molecular weight hydrophilic matrix forming compounds.

According to one embodiment of the invention, the Matrix Forming Substance is a neutral Matrix Forming polymer. Examples include but are not limited to: hydroxypropyl cellulose (HPC), hydroxyethyl cellulose (HEC), hydroxypropyl methyl cellulose (HPMC), ethyl cellulose (EC), starch, hydroxyethyl starch, tetrastarch, hetastarch, dextran, polyvinyl pyrrolidone, polyurethane, or polyvinyl alcohol.

In another embodiment, the Matrix Forming polymer is polyurethane, preferably the polyurethane is a hydrophilic polymer or copolymer capable of absorbing at least 5% of water of the dry polymer weight.

In another embodiment, the Matrix Forming Substance comprises a low molecular weight compound that does not reduce mEq amount of excess positive charge presented by the Delivery Matrix below the mEq amount of positive charge presented by the Active Component.

In another embodiment of the invention, the Matrix Forming Substance comprises a non-ionic amphiphilic compound that is neutral in terms of charge and does not reduce the mEq amount of positive charge presented by the Delivery Matrix below the mEq amount of positive charge presented by the Active Component in the delivery system. Examples of non-ionic amphiphilic compounds include, but are not limited to: polyoxyethylene-polyoxypropylene block copolymer, polyoxyl castor oil, polyoxyl hydrogenated castor oil, polyoxyl stearate, polyoxyl 15 hydroxystearate, polyoxyl cetostearyl ether, and polyoxyethylene sorbitan fatty acid esters. In a preferred embodiment, the non-ionic amphiphilic Matrix Forming compound comprises a polyoxyl 15 hydroxystearate, such as material known under trade name Kolliphor HS15 from BASF.

In one embodiment of the invention, the Matrix Forming Substance comprises a hydrophilic low molecular weight compound that is neutral in terms of charge and does not reduce the mEq amount of excess positive charge donated by the Delivery Matrix below the mEq amount of the positive charge presented by the Active Component. Examples of neutral low molecular weight hydrophilic Matrix Forming compounds include but are not limited to: water; alcohols, such as ethanol, isopropanol, eugenol, di- and poly-ols, glycerol, propylene glycol, hexylene glycol, pantothenyl alcohol, dexpanthenol, xylitol, mannitol, sorbitol, and polyethylene glycol; salts of mono-valent metals, such as sodium chloride and potassium chloride; and mixtures thereof.

According to another embodiment, the Matrix Forming Substance may include one or more of an acceptor of proton ions (H+) in amounts that do not reduce the mEq amount of excess positive charge presented by the Delivery Matrix below the mEq amount of excess positive charge presented by the Active Component in the delivery system. The acceptor of proton ions (H+) may be a basic compound. Examples include but are not limited to: sodium hydroxide, potassium hydroxide, ammonia hydroxide, magnesium hydroxide, calcium hydroxide, tromethamine, trolamine, diisopropanolamine, diethanolamine, and mixtures thereof. It will be understood herein that the acceptor of the proton ions is used herein to adjust some physio-chemical properties of the delivery system such as pH, solubility of the components, viscosity and the like. The acceptor of proton ions is used herein in amounts that do not reduce excess positive charge in the delivery matrix below the positive charge presented by the Active Component as is described by the following charge balance equation: SUM $(X_i * p_i)$ − SUM$(Y_j * n_j) \geq$ SUM $(W_k * p_k)$, where in the Delivery System: $X_i$ is the weight fraction of i-th Cationic Component and $p_i$ is it's nominal positive charge density; $Y_j$ is the weight fraction of the j-th acceptor of proton ions (the base) and $n_j$ is it's nominal negative charge density; $W_k$ is the weight fraction of the k-th Cationic Active Component and $p_k$ is it's nominal positive charge density.

It will be understood that delivery systems for cationic amphiphilic actives described in the invention can be designed in various physical states: in liquid, gel or solid forms.

In one embodiment the antimicrobial Delivery System is in a gel form (viscosity>500 cPs) that comprises cationic anti-microbial peptide (0.5-5%), chitosan with a DDA (degree of de-acetylation) of 70-100%, (1-2.5%), acetic acid (0.4-1%), sodium hydroxide (0.05-0.5%) and water. The gel can be used for application to wounds to prevent or treat infection. In another embodiment the antimicrobial Delivery System is in a gel form (viscosity>500 cPs) that comprises cationic anti-microbial peptide (0.5-5%), chitosan with DDA>95% (1-2.5%), acetic acid (0.4-1%), sodium hydroxide (0.05-0.5%), hydroxyethyl cellulose (0.5-2%), polyoxyethylene-polyoxypropylene block copolymer Pluronic F68 (0.5-1.5%) and water. The gel can be used for application to wounds to prevent or treat infection.

In another embodiment, the Delivery System is a composition in solid form which is first prepared in gel form by mixing one or more of cationic anti-microbial peptides at concentrations 0.05-1.0%, more preferred concentrations 0.08-0.5%, and most preferred concentration 0.2-0.3%, with chitosan DDA of 70-100% at concentration 0.6-2.4%, more preferred concentration 0.9-2.1%, and the most preferred concentration 1.1-1.3%, acetic acid at concentration 0.1-0.6%, more preferred concentration 0.25-0.45%, and most preferred concentration 0.30-0.35%, sodium hydroxide at concentrations 0.01-0.14%, more preferred concentrations 0.03-0.11%, and most preferred concentration 0.06-0.1%, and water. The obtained gel is cast in molds and lyophilized to remove water. After removing water the obtained delivery system in solid sponge form has composition: one or more cationic anti-microbial peptide at concentration 6.4-24.2%, more preferred concentration 6.6-15.6%, and most preferred concentration 12.0-15.0%, chitosan at concentration 58-79%, more preferred concentration 66.5-71.5%, and most preferred concentration 63.3-66.4%, acetic acid at concentration 13-20%, more preferred concentration 15-19%, and most preferred concentration 17.0-18.5%, sodium hydroxide at concentration 1.0-6.0%, more preferred concentration 3.5-5.5%, and most preferred concentration 4.5-5.0%. The obtained solid sponge delivery system can be further pressed into sheets and for application to wounds to prevent or treat infection.

In another embodiment the Delivery System is in a solid form which can be obtained by impregnating a solid Delivery Matrix with a liquid composition from a solvent, following drying the solvent from the matrix, wherein a solid Delivery Matrix can be in the form of a sheet, sponge, non-woven or woven fiber, hydrofiber, mesh, foam or powder. Suitable materials include but are not limited to: polyurethane, chitosan, cellulose, rayon, nylon, polyethylene, polypropylene, collagen, acellular dermal matrix, acellular dermal allograft, acellular dermal xenograft, amniotic membrane, and mixtures thereof. Examples of solvents include but are not limited to: water, methanol, ethanol, propanol, isopropanol, butanol, isobutanol, acetone, methyl ethyl ketone, methyl isobutyl ketone, methyl acetate, ethyl acetate, propyl acetate, isopropyl acetate, butyl acetate, isobutyl acetate, ethyl formate, tert-butylmethyl ether, tetrahydrofuran, ethyl ether, glycofurol, heptane, pentane, acetonitrile, and mixtures thereof.

In another embodiment, the Delivery System is a composition in solid form which can be prepared by impregnating a fibrous chitosan sheet material, such as ChitoSAM Active™ Hemostatic Wound Dressing (SAM Medical): a fibrous chitosan sheet is impregnated with a solution comprising cationic antimicrobial peptide (0.5-5%), citric acid (0.5-10%), ethanol (40-50%) and water (40-50%) and then dried. The obtained dry dressing can be used for application to wounds to prevent or treat infection.

According to the invention, a delivery system can be in the form of a solid coating applied on a medical device from a liquid composition comprising a solvent followed by drying the solvent, wherein the solvent is selected from: water, methanol, ethanol, propanol, isopropanol, butanol, isobutanol, acetone, methyl ethyl ketone, methyl isobutyl ketone, methyl acetate, ethyl acetate, propyl acetate, isopropyl acetate, butyl acetate, isobutyl acetate, ethyl formate, tert-butylmethyl ether, tetrahydrofuran, ethyl ether, glycofurol, heptane, pentane, acetonitrile and mixtures thereof. In one embodiment a liquid composition comprising 0.1-1.0% cationic antimicrobial peptide, 14-18% hydrophilic polyurethane PU 077 (custom synthesized medical grade PU), 0.2-3.0% citric acid, 0.15-2.0% polyoxyl 15 hydroxystearate (Kolliphor HS15, BASF), 40-50% MEK and 28-40% ethanol can be applied on a medical device such as a catheter or an endotracheal tube. After removing MEK and ethanol solvents by drying the wet coating a solid coating comprising 0.5-4.5% cationic antimicrobial peptide, 75-96% hydrophilic polyurethane, 1.4-14.5% citric acid and 1.0-8.5% polyoxyl 15 hydroxystearate is obtained on a medical device. The antimicrobial peptide is released in a sustained mode from the coating and prevents colonization of device by pathogenic organisms.

In another embodiment dry films comprising 1-10% cationic antimicrobial peptide, 75-96% proprietary medical grade hydrophilic polyurethane PU 025 and 1-15% citric acid were prepared by casting and drying the formulation from a solvent (25% ethanol in 75% tetrahydrofuran). The films after laminating to medical grade transfer adhesive can be applied on a medical device such as endotracheal tube or wound drain tubing by wrapping desired portion of the medical device tubing with the obtained adhesive antimicrobial film. The antimicrobial peptide is released in a sustained mode from the film and prevents the wrapped device portion and surrounding body tissue from colonization with infection.

In another embodiment dry films comprising 8.6 wt % ASP1 antimicrobial peptide (SEQ ID NO: 17 in Table A), 82.8 wt % proprietary medical grade hydrophilic polyurethane PU 025 and 8.6 wt % citric acid were prepared by casting and drying the formulation from a solvent (25% ethanol in 75% tetrahydrofuran). The films, after laminating to medical grade transfer adhesive can be applied on a medical device such as endotracheal tube or wound drain tubing by wrapping desired portion of the medical device tubing with the obtained adhesive antimicrobial film. The antimicrobial peptide is released in a sustained mode from the film and prevents the wrapped device portion and surrounding body tissue from colonization with infection.

The Active Component herein refers to a component having at least one bioactive cationic molecule possessing an excess positively charged moieties at charge density$\geq 1$ mEq/g, in particular, such molecules comprise amphiphilic cationic antimicrobial peptides (AMPs), a class of peptides isolated from natural sources ranging from prokaryotes to plants to insects to animals and to humans that evolved to provide nonspecific immune protection in organisms, in particular protection from infection. For example more than 150 antimicrobial peptides called cecropins were isolated from insects. Other examples of natural AMPs are tachyplesins which are 17 or 18 amino acid antimicrobial peptides isolated from the haemocytes of the Japanese horseshoe crab, *Tachypleus tridentatus*. Defensins and cathelicidins are examples of families of antimicrobial peptides found in humans. Bacteriocins are bacterially produced peptides that exert antimicrobial activity against other bacteria. Bacteriocins are broad family of AMPs that is further classified into two major groups: the lanthionine-containing bacteriocins (class I) and the non-lanthionine-containing bacteriocins (class II). Nisin, a positively charged peptide of 34 amino acids that is used as preservative in food industry, is an example of a lantibiotic bacteriocin produced by *Lactococcus lactis*. The most well studied AMPs commonly display an amphipathic conformation having positively charged and hydrophobic groups segregated onto opposite faces of an alpha helix, beta-sheet, or other tertiary structure. Most AMP sequences do not exceed 50 amino acids and more than 2600 such peptides either obtained from natural sources or de-novo synthesized peptides are known to date. Numerous analogues of natural antimicrobial peptides have been developed comprising cationic molecules mimicking the amphipathic conformation of AMPs. Such analogues for examples include shorter AMP fragments demonstrating antimicrobial activity. Other AMP analogues include peptide sequences comprising D-amino-acids as partial or full diastereomer substitutes of the natural L-amino acids in AMPs. Yet, another class of synthetically modified AMP analogues comprises peptide sequences including, non-naturally occurring amino acids, chemically modified amino acids as well as fluorinated amino acids. Lipopeptides, in particular conjugates of fatty acids or fatty alkyl groups with cationic peptide motifs are another class of AMP mimetics that have been explored as potential antimicrobials. Large classes of amphiphilic AMP inspired mimetics comprise α-peptoid, β-peptide and β-peptoid sequences. Ceragenins is another type of synthetic amphiphilic cationic compound designed to mimic the activities of antimicrobial peptides. Ceragenins have been synthesized from a steroid scaffolding of cholic acid derivatized with amine groups to impart cationic properties. In particular, the Active Component herein refers to de-novo synthesized cationic antimicrobial peptides derived from Lentivirus Lytic Peptide 1 (LLP1) described in U.S. Pat. Nos. 6,835,713; 6,887,847 and 8,071,540 with the sequences of the peptides shown in Table A.

TABLE A

Sequences of cationic antimicrobial peptides derived from Lentivirus Lytic Peptide 1 (LLP1) described in patents: U.S. Pat. Nos. 6,835,713; 6,887,847; and 8,071,540.

| Sequence Abbr | Amino Acid Sequences of Cationic Antimicrobial Peptides | SEQ ID NO |
|---|---|---|
| SA-5 | RVIRVVQRAC RAIRH IVRRI RQGLR RIL | SEQ ID NO: 1 |
| LSA-5 | RVIRVVQRACRAIRHIVRRIRQ GLRRILRVV | SEQ ID NO: 2 |
| WLSA-5 | RWIRVVQRWCRAIRHIWRRIRQ GLRRWLRVV | SEQ ID NO: 3 |
| LBU-1 | RVVRVVRRVVRR | SEQ ID NO: 4 |
| LBU-2 | RRVVRRVRRVVRRVRVVRRVV RR | SEQ ID NO: 5 |

TABLE A-continued

Sequences of cationic antimicrobial peptides derived from Lentivirus Lytic Peptide 1 (LLP1) described in patents: U.S. Pat. Nos. 6,835,713; 6,887,847; and 8,071,540.

| Sequence Abbr | Amino Acid Sequences of Cationic Antimicrobial Peptides | SEQ ID NO |
|---|---|---|
| LBU-3 | VRRVVRRVVRVVRRVVRRVRRV VRRVVRVVRRVVRR | SEQ ID NO: 6 |
| LBU-3.5 | RRVVRRVRRVVRRVVRVVRRVV RRVRRVVRRVVRVVRRVVRR | SEQ ID NO: 7 |
| LBU-4 | RVVRVVRRVVRRVRRVVRRVVR VVRRVVRRVRRVVRRVVRVVRR VVRR | SEQ ID NO: 8 |
| WLBU-1 | RVVRVVRRWVRR | SEQ ID NO: 9 |
| WLBU-2 | RRWVRRVRRVWRRVVRVVRRWV RR | SEQ ID NO: 10 |
| WLBU-3 | VRRVWRRVVRVVRRWVRRVRRV WRRVVRVVRRWVRR | SEQ ID NO: 11 |
| WLBU-4 | RVVRVVRRWVRRVRRVWRRVVR VVRRWVRRVRRVWRRVVRVVRR WVRR | SEQ ID NO: 12 |
| WR6 | RRWWRR | SEQ ID NO: 13 |
| ASP-2 (WR12) | RWWRWWRRWWRR | SEQ ID NO: 14 |
| WR16 | WRRWWRRWWRWWRRWWRR | SEQ ID NO: 15 |
| WR24 | RRWWRRWRRWWRRWWRWWRRWW RR | SEQ ID NO: 16 |
| ASP-1 | RRWVRRVRRWVRRVVRVVRRWV RR | SEQ ID NO: 17 |

The Delivery System according to the present invention may be used in a variety of medical applications and treatments for delivery of the Active Component to a target site such as surgical applications, dental applications, medical devices, and wound treatment. Certain embodiments have been described herein, with reference to various compounds and compositions for the Delivery Matrix and Matrix Forming Substances. However, it will be understood by those of skill in the art, that other compounds and compositions and applications for the Delivery System, as described herein, are envisioned to be within the scope of the invention and are not limited by the above-description and preferred embodiments, as will be understood by those of skill in the art, with reference to this disclosure.

Certain embodiments have been described herein, with reference to various Active Components and combinations of Active Components that may be included in the Delivery System such as naturally occurring host defense peptides, anti-microbial peptides (AMPs), synthetic analogues of naturally occurring host defense peptides as well as cationic peptide mimetic molecules. However, it will be understood by those of skill in the art, that other cationic Active Compounds for the Delivery System, as described herein, are envisioned to be within the scope of the invention and are not limited by the above-description and preferred embodiments, as will be understood by those of skill in the art, with reference to this disclosure.

EXAMPLES

Example 1

Various materials comprising polymers with excess positive charge and polymers with excess negative charge were loaded with antimicrobial peptides ASP-1 (SEQ ID NO: 17 in Table A) and ASP-2 (WR12, SEQ ID NO: 14 in Table A) by impregnating the materials with aqueous solutions of the peptides followed by drying in a vacuum. Release and % recovery of the peptides from the matrices was studied over 7 days and shown in Table 1. below.

TABLE 1

Recovery of ASP-1 and ASP-2 peptides from various cationic and anionic matrices.

| Delivery Matrix Material Trade Name | Supplier | Delivery Matrix Material | Matrix excess charge | Other Delivery Matrix Forming Substances | Release medium | ASP-1 Recovery | ASP-2 Recovery |
|---|---|---|---|---|---|---|---|
| Puracol Plus | Medskin Solutions | 100% collagen | positive | none | PBS pH 7.4 | 84% | |
| Fibracol Plus | J&J | 90% collagen + 10% CaAlginate | positive | NaCl | HPBS pH 6.8 | 51% | 90% |
| ChitoSAM | SAM Medical | 100% chitosan | positive | NaCl/ Acetate pH 6.0 | PBS pH 7.4 | 68% | |
| Celox granules | MedTrade Products Ltd. | 100% chitosan | positive | NaCl/ Acetate pH 6.0 | HPBS pH 6.8 | 68% | |
| Algisite M | Smith & Nephew | 100% Ca alginate | negative | none | PBS pH 7.4 | 4% | |
| Protanal LF10/60LS | FMC Bio- polymer | 100% alginate | negative | NaCl/ Acetate pH 6.0 | AcBS pH 6.0 | 0.5% | 0.8% |

TABLE 1-continued

Recovery of ASP-1 and ASP-2 peptides from various cationic and anionic matrices.

| Delivery Matrix Material Trade Name | Supplier | Delivery Matrix Material | Matrix excess charge | Other Delivery Matrix Forming Substances | Release medium | ASP-1 Recovery | ASP-2 Recovery |
|---|---|---|---|---|---|---|---|
| Aqualon CMC 9M31F | Ashland | carboxy methyl cellulose | negative | NaCl/ Acetate pH 6.0 | PBS pH 7.4 | 9% | |
| Aqualon CMC 7LF | Ashland | carboxy methyl cellulose | negative | Histidine, pH 6.0 | HPBS pH 6.8 | 2.6% | |

It was seen from the performed studies that recovery of cationic antimicrobial peptides from systems with positive excess charge was higher than 50% whereas the recovery from systems with excess negative charge was less than 10%.

Example 2

Gels comprising anionic polymer carpoxymethyl cellulose (CMC) available under trade name Aqualon CMC 9M31F and neutral polymer hydroxyethyl cellulose (HEC) available under trade name Natrosol 250HX were prepared in acetate/saline buffers (AcBS) at pHs 5.0 and 6.0 and loaded with 1% antimicrobial peptide ASP-1 (SEQ ID NO: 17 in Table A) to study recovery of the peptides from the gels in release experiments during at least 4 days. Compositions of the gels and ASP-1 recovery are shown in the Table 2 below.

TABLE 2

ASP-1 recovery from gels having different compositions

| | Gel ID: | | | | | |
|---|---|---|---|---|---|---|
| | WD-085C | WD-085D | WD-085E | WD-085F | WD-085G | WD-085H |
| ASP-1, % in gel | 1 | 1 | 1 | 1 | 1 | 1 |
| CMC % in gel | 2 | 2 | 0.5 | 0.5 | 2 | 0.5 |
| HEC % in gel | 0 | 0 | 1.5 | 1.5 | 0 | 1.5 |
| AcBS Buffer pH in gel | pH 5.0 | pH 6.0 | pH 5.0 | pH 6.0 | pH 5.0 | pH 5.0 |
| ASP-1 Recovery | 0.8% | 1.3% | 23% | 30% | 2% | 19% |

It was seen from the studies shown in Table 2 that ASP-1 recovery from anionic CMC gels was very poor, less than 3%. Dilution of anionic CMC gels 4 times with neutral HEC gel led to increase in ASP-1 recovery, which however, remained at low levels between about 20-30%. The data obtained indicates the presence of an anionic polymer with excess negative charge tends to significantly reduce recovery of cationic peptides from delivery systems.

Example 3

A cationic polymer chitosan (CS320: MW=320 kDa, DDA=95%, Primex) gel comprising 1% ASP-1 peptide (SEQ ID NO: 17 in Table A) with the following composition was prepared for peptide release and recovery studies:

TABLE 3.1

ASP-1 gel composition with corresponding charge densities (p) of the components

| GEL ID: WD-086-G9-E2 | % in gel | p, mEq/g component | P, mEq/100 g gel |
|---|---|---|---|
| CS320 | 1.67 | +5.8 | +9.7 |
| Acetic acid | 0.53 | +16.7 | +8.9 |
| NaOH | 0.17 | −25.0 | −4.2 |
| glycerol | 1.00 | 0.0 | 0.0 |
| ASP-1 | 1.00 | +3.8 | +3.8 |
| Water | 95.63 | 0 | 0 |
| Total | 100.00 | Matrix P: | +14.4 |

ASP-1 release in histidine/phosphate/saline buffer pH 6.8 (HPBS, pH 6.8) at 37° C. was studied over 4 days. The buffer above the gel was replaced daily and the concentration of ASP-1 in the removed buffer was measured by HPLC. The total ASP-1 recovery from the cationic chitosan gel over 4 days was 72%.

Example 4

A chitosan (CS320, MW 320 kDa, DDA=95%, Primex) gel comprising 0.5% ASP-1 peptide with the composition shown in Table 4.1 was prepared, lyophilized to produce a dry sponge and pressed under 0.5 tons into sheets about 0.2-0.25 mm thick for peptide release and recovery studies.

TABLE 4.1

ASP-1 sponge composition (lot# WD-096A) lyophilized from gel with corresponding charge densities (p) of the components

| Sponge lot# WD-096A | % in Gel | % in Sponge | p, mEq/g component | P, mEq/100 g sponge |
|---|---|---|---|---|
| CS320 | 1.2 | 56.5 | +5.8 | +328.8 |
| Acetic acid | 0.3 | 15.7 | +16.7 | +261.3 |
| NaOH | 0.1 | 4.0 | −25.0 | −100.0 |
| ASP-1 | 0.5 | 23.9 | +3.82 | +91.3 |
| Water | 97.9 | | | |
| Total | 100.0 | 100.0 | Matrix P: | +491.1 |

The pressed sponge sheets were die cut into discs, ⅝" in diameter, and peptide release from discs was studied in three buffers with different pHs over 7 days at 37° C. Buffers above disks were replaced daily for the first 4 days with a final buffer collection on day 7. The ASP-1 peptide concentration in the buffers removed from disks was measured by HPLC. Two phosphate buffers containing 0.9% saline (PBS) at pHs 6.5 and 7.5, and a borate buffer containing 0.9% saline (BBS) at pH 8.5 were employed in the study. ASP-1 recovery from the disks is shown in FIG. 1, showing the recovery of ASP-1 peptide from chitosan sponges at different pHs. FIG. 1 shows that about 10-38% peptide is released in the first day, about 25-32% is released in the second day, about 7-20% is released in the third day and about 2-10% is released on the fourth day. Total ASP-1 peptide recovery out to day 7 is summarized in Table 4.2.

TABLE 4.2

ASP-1 recovery from ASP-1 loaded chitosan sheets under different pH conditions

| Buffer pH | ASP-1 recovery, % |
|---|---|
| PBS pH 6.5 | 67 |
| PBS pH 7.5 | 77 |
| BBS pH 8.5 | 78 |

Example 5

Five ASP-1 (SEQ ID NO: 17 in Table A) peptide loaded gel compositions comprising Chitosan (CS320) (MW=320 kDa, DDA=95%, Primex), acetic acid and sodium hydroxide were prepared as shown in Table 5.1. ASP-1 loading in gels varied from 0.25% to 2%, and three gels also contained 1% glycerol.

TABLE 5.1

Compositions of chitosan gels (lots# WD-089) loaded with ASP-1 peptide

| | GEL ID: | | | | |
|---|---|---|---|---|---|
| | WD-089A-0.5% | WD-089A-1% | WD-089A-2% | WD-089B-0.25% | WD-089C-0.5% |
| ASP-1, % | 0.50 | 1.00 | 2.00 | 0.25 | 0.50 |
| CS320, % | 1.67 | 1.67 | 1.67 | 1.67 | 1.67 |
| Acetic acid, % | 0.53 | 0.53 | 0.53 | 0.53 | 0.53 |
| NaOH, % | 0.17 | 0.17 | 0.17 | 0.17 | 0.17 |
| Glycerol, % | 1.00 | 1.00 | 1.00 | 0 | 0 |
| Water, % | 96.13 | 95.63 | 94.63 | 97.38 | 97.13 |

Antimicrobial efficacy and antimicrobial durability of the freshly prepared ASP-1 gels were tested against biofilms formed by methicillin-resistant *Staphylococcus aureus* (MRSA USA 300, ATCC BAA-1717). The MRSA biofilms were grown on 12.7 mm diameter discs (coupons) of a polyester (PET) mesh (mesh opening: 70 microns, 28% area) by incubating the PET mesh coupons with 0.5 ml of $10^6$ CFU/mL bacteria in trypticase soy broth (TSB) in a 24 well plate at 37° C. for 24 hrs. Before challenging with biofilms grown in PET mesh coupons, a 0.5 ml aliquot of antimicrobial gel was dispensed in each well of a 24-well plate and pre-incubated in histidine/phosphate/saline buffer at pH 6.8 (HISP) containing 10% heat inactivated human serum (10% HS) for 1, 2 and 3 days at 37° C. with daily replacement of 10% HS/HISP buffer to model exposure of gels to human physiologic fluids up to three days. The coupons with 24-hrs mature biofilms were transferred and placed on top of the pre-incubated gels followed by addition of 0.5 mL of 10% HS/HISP. After challenging biofilm coupons for 24 hrs at 37° C. with pre-incubated gels, viable bacteria were recovered from the coupons by sonicating for 15 min in Dey/Engley neutralizing broth and quantified by microdilution plating on TSB/agar. Biofilm coupons treated with saline instead of gels were used as controls. All samples were tested in triplicate.

TABLE 5.2

Efficacy of ASP-1 chitosan gels (lots# WD-089) against MRSA biofilms

| | | Gel pre-incubation time in 10% HS/HISP pH 6.8 | | | saline |
|---|---|---|---|---|---|
| Gel ID | ASP-1, % | 1 day log (cfu/mL) | 2 days log (cfu/mL) | 3 days log (cfu/mL) | control log (cfu/mL) |
| WD-089A-0.5% | 0.5 | 0 | 0 | 4.6 ± 1.1 | 7.2 ± 0.4 |
| WD-089A-1% | 1.0 | 0 | 0 | 4.7 ± 0.9 | 7.2 ± 0.4 |
| WD-089A-2% | 2.0 | 0 | 0 | 0 | 7.2 ± 0.4 |
| WD-089B-0.25% | 0.25 | 0 | 4.5 ± 0.7 | na | 5.8 ± 0.3 |
| WD-089B 0.5% | 0.5 | 0 | 2.7 ± 0.5 | na | 5.6 ± 0.4 |

Table 5.2 shows gels loaded with 0.25% and 0.5% ASP-1 eradicated MRSA biofilms after 1 day of pre-incubation in 10% HS/HISP buffer modeling human physiologic conditions. Gels loaded with 1% and 2% ASP-1 peptide eradicated MRSA biofilms after 2 and 3 days of pre-incubation, respectively. The obtained anti-biofilm antimicrobial durability results indicate that ASP-1 peptide is available for release from chitosan gels in amounts sufficient to effectively kill MRSA biofilm after prolonged exposure of gels to conditions modeling human physiological environment.

Example 6

Two ASP-1 (SEQ ID NO: 17 in Table A) peptide loaded gel compositions (lots #WD-091A) comprising chitosan (CS320) (MW=320 kDa, DDA=95%, Primex), acetic acid and sodium hydroxide were prepared as shown in Table 6.1. ASP-1 loading in gels was 0.2% and 0.9%.

TABLE 6.1

Compositions of chitosan gels loaded with ASP-1 peptide

| Gel lot# | WD-091A-0.2% | WD-091A-0.9% |
|---|---|---|
| ASP-1, % | 0.20 | 0.90 |
| CS320 (DDA = 95%), % | 1.67 | 1.67 |
| Acetic acid, % | 0.53 | 0.53 |
| NaOH, % | 0.17 | 0.17 |
| Water, % | 97.43 | 96.73 |

Effect of gels storage on efficacy against biofilms formed by methicillin-resistant *Staphylococcus aureus* (MRSA USA 300, ATCC BAA-1717) was studied after gels were stored for 3 days, 17 days and 1 month. MRSA biofilms were grown on 12.7 mm diameter discs (coupons) of a polyester (PET) mesh (mesh opening: 70 microns, 28% area) by incubating the PET mesh coupons with 0.5 ml of $10^6$ CFU/mL bacteria in trypticase soy broth (TSB) in 24 well plates at 37° C. for 24 hrs. An aliquot of 0.5 ml of gel was dispensed in each well within the 24-well plates and challenged with biofilm coupons in 0.5 mL 10% HS/HISP (10% human serum in histidine/phosphate/saline buffer at pH 6.8) without pre-incubation in any medium (0 days) or after pre-incubation in 10% HS/HISP for 1 or 2 days at 37° C. with daily replacement of the 10% HS/HISP buffer to model exposure of gels to human physiologic fluids up to two days. The coupons with 24-hrs mature biofilms were transferred and placed on top of the gels and 0.5 mL of fresh 10% HS/HISP buffer was added. Plates were incubated for 24 hrs at 37° C. Viable bacteria were then recovered from the coupons by sonicating for 15 min in Dey/Engley neutralizing broth and quantified by microdilution plating on TSB/agar. Biofilm coupons treated with saline instead of gels were used as controls. All samples were tested in triplicate.

Results shown in Table 6.2 indicate the efficacy of ASP-1 chitosan gels was not impacted by storage.

TABLE 6.2

Effect of ASP-1 gel storage on efficacy against MRSA biofilms.

| | | | Log CFU/mL bacteria recovered | | | |
|---|---|---|---|---|---|---|
| | | | Gel pre-incubation time in 10% HS/pH 6.8 | | | |
| Gel lot# | ASP-1, % | Storage | 0 days | 1 day | 2 days | saline control |
| WD-091A-0.2% | 0.2% | 3 days | 0 | 2.7 ± 1.7 | na | 6.1 ± 0.3 |
| WD-091A-0.2% | 0.2% | 17 days | 0 | 0.7 ± 1.2 | na | 5.6 ± 0.1 |
| WD-091A-0.2% | 0.2% | 1 month | 0 | 5.1 ± 0.6 | na | 6.1 ± 0.2 |
| WD-091A-0.9% | 0.9% | 3 days | na | 0 | 0 | 6.1 ± 0.3 |
| WD-091A-0.9% | 0.9% | 17 days | na | 0 | 0 | 5.6 ± 0.1 |
| WD-091A-0.9% | 0.9% | 1 month | na | 0 | 0 | 6.1 ± 0.2 |

TABLE 7.1

ASP-1 sponge composition (lot# WD-088F3) lyophilized from gel with corresponding charge densities (p) of the components.

| | % in Gel | % in Sponge | p, mEq/g component | P, mEq/100 g sponge |
|---|---|---|---|---|
| ASP-1, % | 0.38 | 19.1 | +3.82 | +73.0 |
| CS320 (DDA = 95%) | 1.20 | 60.2 | +5.8 | +350.4 |
| Acetic acid | 0.33 | 16.7 | +16.7 | +278.1 |
| NaOH | 0.08 | 4.0 | −25.0 | −100.0 |
| Water, % | 98.01 | 0 | | |
| Total | 100.0 | 100.0 | Matrix P: | +528.5 |

The sheets were cut into discs, ⅝" in diameter, and antimicrobial efficacy of the obtained discs were tested against biofilms formed by methicillin-resistant *Staphylococcus aureus* (MRSA LISA 300, ATCC BAA-1717) or *Pseudomonas aeruginosa* (ATCC 15692). A commercial chitosan silver wound dressing (Medline Opticell AG Plus Silver Antibacterial Gelling Fiber Wound Dressing) was tested in parallel for comparison. Biofilms were grown on 12.7 mm diameter discs (coupons) of a polyester (PET) mesh (mesh opening: 70 microns, 28% area) by incubating the PET mesh coupons with 0.5 ml of $10^6$ cfu/mL bacteria solution in trypticase soy broth (TSB) in a 24 well plate at 37° C. for 24 hrs. Before challenging with biofilms grown in PET mesh coupons, discs of WD-088F3 and Opticell AG Plus dressings were dispensed in 24-well plates and pre-incubated in different buffers containing 10% heat inactivated human serum (10% HS) for 1, 2 or 3 days at 37° C. with daily replacement of 10% HS/buffers to model exposure of gels to human physiologic fluids up to three days. In MRSA biofilm studies samples were pre-incubated in 10% HS buffered at pHs 6.5, 7.5 and 8.0. In *Pseudomonas aeruginosa* biofilm studies, samples were pre-incubated in 10% HS buffered at pHs 6.5 and 7.5. Coupons with 24-hrs Example 7

Chitosan (CS320, DDA=95%, Primex) sponges (lot #WD-088F3) comprising ASP-1 peptide (SEQ ID NO: 17 in Table A) were prepared according to the composition in Table 7.1 with lyophilization. Dry sponges were pressed under 0.5 tons into sheets about 0.2-0.25 mm thick.

mature biofilms were placed on the pre-incubated samples and 0.5 mL of fresh 10% HS/buffer was added. After challenging biofilm coupons for 24 hrs at 37° C. with pre-incubated dressings, viable bacteria were recovered from PET coupons by sonicating for 15 min in Dey/Engley neutralizing broth and quantified by microdilution plating on TSB/agar. Biofilm coupons treated with saline were used as biofilm growth controls. All samples were tested in triplicate.

As shown in Table 7.2, ASP-1 chitosan samples (lot #WD88F3) demonstrated better MRSA biofilm eradication than Opticel Ag+dressing after 1, 2 and 3 days of pre-incubation in 10% HS.

TABLE 7.2

Efficacy of ASP-1 chitosan sheets (lot# WD-088F3) and Opticel Ag+ wound dressing against MRSA biofilms.

| Dressing ID | Buffer pH | Pre-incubation time in 10% HS/buffer | | | saline control log (CFU/mL) |
|---|---|---|---|---|---|
| | | 1 day log (CFU/mL) | 2 days log (CFU/mL) | 3 days log (CFU/mL) | |
| WD-088F3 | PBS pH 6.5 | 0 | 0 | 0 | 6.4 ± 0.1 |
| Opticel Ag+ | PBS pH 6.5 | 1.2 ± 1.1 | 1.1 ± 1.0 | 2.0 ± 0.3 | 6.4 ± 0.1 |
| WD-088F3 | PBS pH 7.5 | 0 | 0 | 0.9 ± 1.3 | 6.0 ± 0.2 |
| Opticel Ag+ | PBS pH 7.5 | 0.7 ± 1.3 | 2.9 ± 0.2 | 3.9 ± 0.2 | 6.0 ± 0.2 |
| WD-088F3 | BBS pH 8.0 | 0.6 ± 0.6 | 0 | 0 | 5.9 ± 0.4 |
| Opticel Ag+ | BBS pH 8.0 | 3.1 ± 0.5 | 3.9 ± 0.8 | 3.5 ± 0.2 | 6.0 ± 0.2 |

As shown in the Table 7.3, after 1 and 2 days of pre-incubation in 10% HS performance of ASP-1 chitosan samples (lot #WD88F3) against *Pseudomonas aeruginosa* biofilms was better than that of Opticel Ag+dressing, however after 3 days of pre-incubation in 10% HS the Opticel Ag+chitosan silver dressing demonstrated better efficacy.

TABLE 7.3

Efficacy of ASP-1 chitosan sheets (lot# WD-088F3) and Opticel Ag+ wound dressing against *Pseudomonas aeruginosa* biofilms.

| Dressing ID | Buffer pH | Pre-incubation time in 10% HS/buffer | | | saline control log (cfu/mL) |
|---|---|---|---|---|---|
| | | 1 day log (cfu/mL) | 2 days log (cfu/mL) | 3 days log (cfu/mL) | |
| WD-088F3 | PBS pH 6.5 | 0 | 0.8 ± 1.4 | 5.7 ± 1.3 | 7.5 ± 0.4 |
| Opticel Ag+ | PBS pH 6.5 | 4.3 ± 0.6 | 2.3 ± 0.7 | 2.4 ± 0.3 | 7.5 ± 0.4 |
| WD-088F3 | PBS pH 7.5 | 0 | 0.6 ± 0.6 | 6.9 ± 0.2 | 7.3 ± 0.3 |
| Opticel Ag+ | PBS pH 7.5 | 2.6 ± 0.2 | 3.5 ± 0.6 | 3.3 ± 0.5 | 7.3 ± 0.3 |

Example 8

Compositions (lot #K-125, Table 8.1) comprising ASP-1 (SEQ ID NO: 17 in Table A) and ASP-2 (WR12, SEQ ID NO: 14 in Table A) peptides, hydrophilic polyurethane PU 077 (custom synthesized medical grade polyurethane), polyoxyl 15 hydroxystearate (Kolliphor HS-15 from BASF) containing citric acid monohydrate (CAxH2O) and compositions without CA xH2O were prepared by dissolving the components in 55% MEK/45% ethanol solvent and dip coated on 12 Fr catheters. Lots K-125A and K-125E comprised citric acid in amounts providing a mEq amount of positive charge (H+) exceeding the mEq amount of positive charge of the active components ASP-1 and ASP-2, whereas lots K-125D and K-125F did not contain citric acid or any other matrix forming cationic or proton (H+) donating component as shown in Table 8.1.

TABLE 8.1

Compositions comprising ASP-1 and ASP-2 peptides, hydrophilic polyurethane (PU 077), polyoxyl 15 hydroxystearate (PEG-15-HS) with and without citric acid monohydrate (CA xH2O).

| Component | p, mEq/g | Lot# K-125A | | Lot# K-125D | | Lot# K-125E | | Lot# K-125F | |
|---|---|---|---|---|---|---|---|---|---|
| | | Wt % | P, mEq/100 g | Wt % | P, mEq/100 g | Wt % | P, mEq/100 g | Wt % | P, mEq/100 g |
| ASP-1 | +3.8 | 1.6 | +6.1 | 1.7 | +6.5 | na | na | na | na |
| ASP-2 | +2.9 | na | na | na | na | 1.6 | +4.6 | 1.7 | +4.9 |
| CA xH2O | +9.5 | 8.1 | +77.0 | 0 | 0 | 8.1 | +77.0 | 0 | 0 |
| PEG-15-HS | 0 | 6.5 | 0.0 | 7.0 | 0.0 | 6.5 | 0.0 | 7.0 | 0 |
| PU077 | 0 | 83.8 | 0.0 | 91.3 | 0.0 | 83.8 | 0.0 | 91.3 | 0 |

The resulting ASP-1 and ASP-2 coated catheters were sterilized by ethylene oxide (EO) gas. After sterilization, peptide purity and recovery from coatings was measured by HPLC after full extraction from catheters. Referring to Table 8.2, one can see that ASP-1 and ASP-2 coatings comprising citric acid monohydrate (lots K-125A and K-125E) demonstrated significantly higher peptide recovery relative to coatings without CAxH2O (lots #K-125D and K-125F).

TABLE 8.2

Effect of citric acid on ASP-1 and ASP-2 peptides recovery from PU 077 coatings after EO gas sterilization.

| lot ID# | ASP-1 wt % | ASP-2 wt % | CAxH2O wt % | PEG-15-HS wt % | PU 077 wt % | % Purity (recovery) before EO | % Purity (recovery) after EO | % Loss after EO |
|---|---|---|---|---|---|---|---|---|
| K-125A | 1.6 | | 8.1 | 6.5 | 83.8 | 95.8 | 90.2 | 5.6 |
| K-125D | 1.7 | | 0 | 7.0 | 91.3 | 89.3 | 22.0 | 67.3 |
| K-125E | | 1.6 | 8.1 | 6.5 | 83.8 | 95.5 | 88.5 | 7.0 |
| K-125F | | 1.7 | 0 | 7.0 | 91.3 | 93.1 | 66.7 | 26.4 |

Example 9

Composition (lot K-132, Table 9.1) comprising ASP-1 peptide (SEQ ID NO: 17 in Table A), custom synthesized hydrophilic medical grade polyurethane (PU 077), polyoxyl 15 hydroxystearate (PEG-15-HS) and citric acid monohydrate (CAxH2O) was prepared by dissolving components in MEK/ethanol solvent and dip coated on 7 Fr triple lumen catheters.

TABLE 9.1

Composition comprising ASP-1, hydrophilic polyurethane (PU 077), polyoxyl 15 hydroxystearate (PEG-15-HS) and citric acid monohydrate (CA xH2O).

| Lot# K-132 | % in liquid | % in solid coat | p, mEq/g component | P, mEq/100 g solid coat |
|---|---|---|---|---|
| ASP-1 | 0.3 | 1.5 | +3.8 | +5.7 |
| CAxH2O | 1.4 | 7.6 | +9.5 | +72.2 |
| PU-077 | 16 | 84.4 | | |
| PEG-15-HS | 1.2 | 6.5 | | |
| MEK | 44.6 | | | |
| Ethanol | 36.5 | | | |

The obtained ASP-1 coated catheters were sterilized by ethylene oxide (EO) gas, vacuum dried and pouched in aluminum foil bags supplied with a desiccant pouch. Peptide purity and recovery from coatings before EO sterilization and after EO sterilization and storage was measured by HPLC after full extraction from catheters. From Table 9.2 one can see that ASP-1 peptide demonstrated good stability after being coated on catheters, sterilized and stored at room temperature up to 9 months.

TABLE 9.2

Stability of ASP-1 peptide in PU 077 coating (lot# K-132) after EO sterilization and storage.

| | t0, before EO | 1 wk after EO | 3 Mo after EO | 6 Mo after EO | 9 Mo after EO |
|---|---|---|---|---|---|
| ASP-1 recovery, μg/cm² coat | 74.2 ± 7.2 | 75.6 ± 9.7 | 79.4 ± 9.8 | 69.5 ± 6.5 | 70.6 ± 6.2 |

Figure 2:
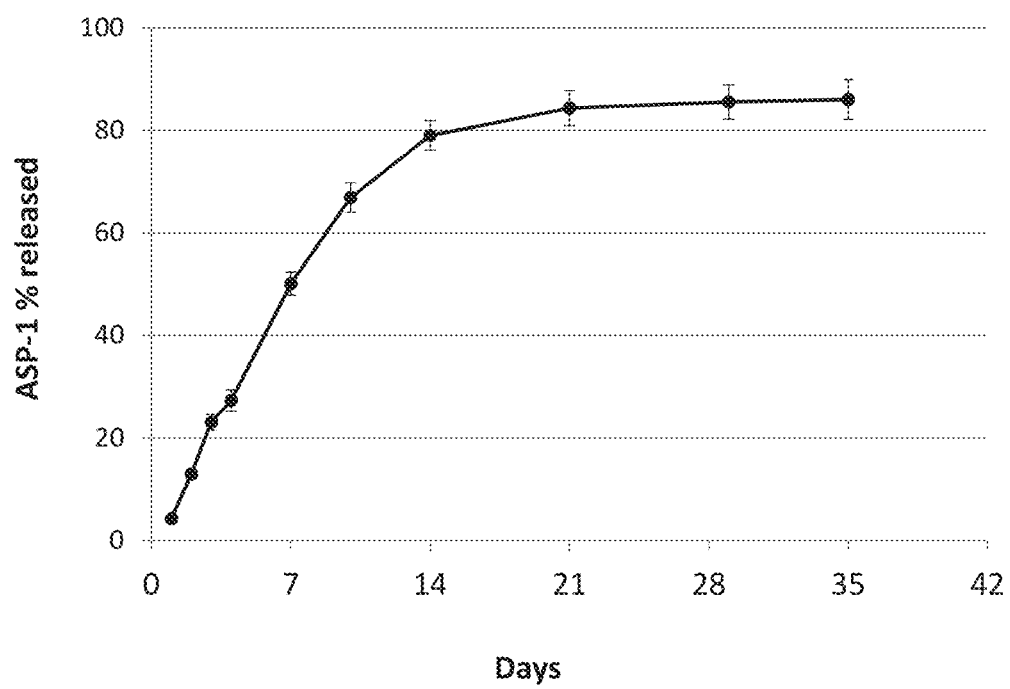
FIG. 2 is a graph showing ASP-1 peptide release from PU 077 catheter coating (lot K-132) in PBS pH 7.4 at 37° C., according to another embodiment of the invention.

ASP-1 peptide release from coated catheters (lot K-132) was studied in PBS, pH 7.4 (phosphate/saline buffer) at 37° C. over 1 month. The incubation buffer was replaced at given time points and the concentration of ASP-1 in extracts was measured by HPLC. ASP-1 recovery from the coated catheters was sustained over the studied period as is shown in FIG. 2.

Figure 3:
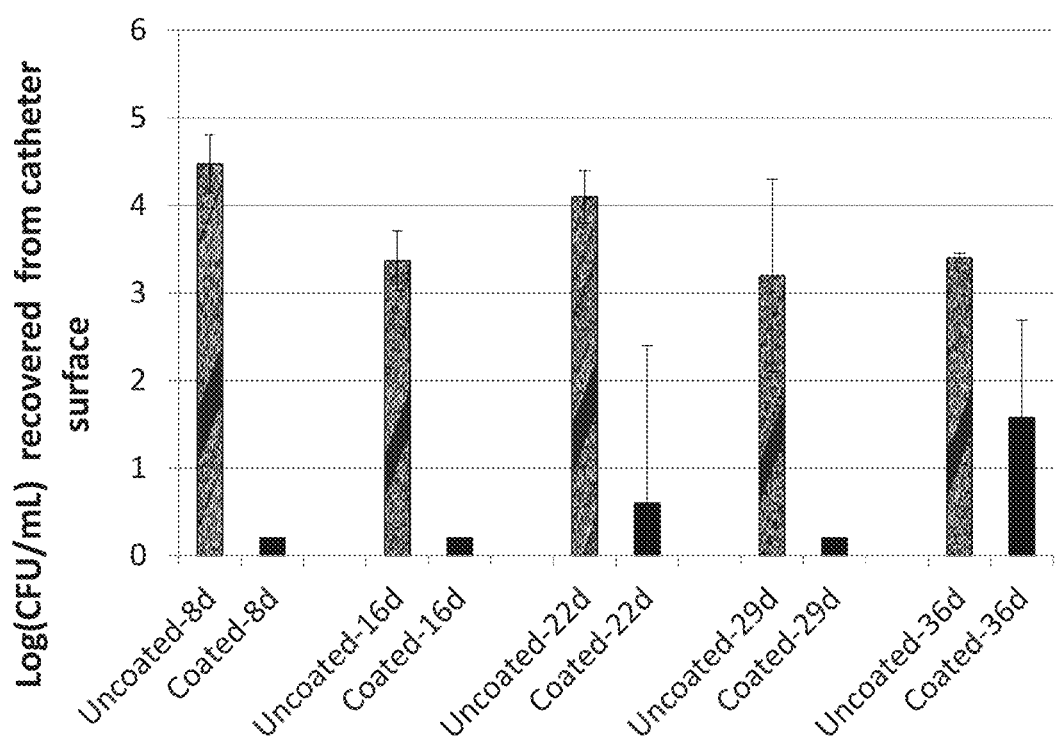
FIG. 3 is a bar graph showing prevention of catheter surface (lot K-132) colonization with *Staphylococcus epidermidis* after coating catheters with ASP-1 peptide, according to another embodiment of the invention.

To assess antimicrobial efficacy, 6 cm segments of the coated catheters (lot K-132) were incubated in 50% human serum (50% HS) in PBS pH 7.4 for up to 36 days with weekly serum replacement followed by incubation in $3\times10^4$ CFU/mL Staphylococcus epidermidis (RP62A) for 24 hrs. Biofilms on surfaces were removed by sonication followed by serial dilution, plating on TSB/agar to determine the number of viable bacteria recovered. Data shown in FIG. 3 demonstrates the ASP-1 peptide coating prevented colonization of catheter surfaces by Staphylococcus epidermidis up to 1 month under conditions modeling human physiologic conditions.

Example 10

Composition (lot ET-008B, Table 10.1) comprising ASP-1 peptide (SEQ ID NO: 17 in Table A), custom synthesized hydrophilic medical grade polyurethane (PU 025), polyoxyl 15 hydroxystearate (PEG-15-HS) and citric acid monohydrate (CAxH2O) was prepared by dissolving the components in THF/ethanol solvent and coated on endotracheal tubes (ETTs, Mallinckrodt Hi-Lo Oral/Nasal Tracheal tube, cuffed, 7.0 mm ID, 9.5 mm OD).

TABLE 10.1

Coating composition (lot# ET-008B) comprising ASP-1, hydrophilic polyurethane (PU 025), polyoxyl 15 hydroxystearate (PEG-15-HS), citric acid monohydrate (CA xH2O), tetrahydrofuran (THF) and ethanol (EtOH).

| Lot# ET-008B | % in wet coat | % in dry coat | p, mEq/g component | P, mEq/100 g dry coat |
|---|---|---|---|---|
| PU-025 | 10.75 | 71.11 | 0 | |
| PEG-15-HS | 1.52 | 10.07 | 0 | |
| CAxH2O | 1.35 | 8.90 | +9.5 | +84.6 |
| ASP-1 | 1.50 | 9.92 | +3.8 | +37.7 |
| THF | 62.99 | | | |
| EtOH | 21.89 | | | |
| Total | 100.00 | 100.00 | | |

In vitro antimicrobial activity of coated endotracheal tubes was studied against three strains of bacteria: Methicillin Resistant Staphylococcus aureus (MRSA, ATCC 700698), Acinetobacter baumannii (ATCC BAA-1605), and Pseudomonas aeruginosa (ATCC 27318), which were stored at −80° C. and sub-cultured on trypticase soy broth (TSB) agar plates at 37° C. prior to experimental assay. A single bacteria colony was aseptically picked from an agar overlay and released in a pre-warmed, 25 ml broth in culture flask. Bacteria culture was incubated overnight in incubator at 37° C.

The antimicrobial durability of ASP-1 coatings was studied on 1 cm long ETT segments. The samples were pre-incubated in 1.5 ml of saline buffered with acetate at pH=6.0 (AcBS, pH 6.0) supplemented with 2 mg/ml bovine serum albumin (BSA) at 37° C. with weekly replacement of the medium. At 1, 2, 3 or 4 weeks after pre-incubation samples were inoculated with 1.5 mL of $10^4$ to $10^5$ CFU/ml bacteria culture diluted in 2% Cation adjusted Mueller Hinton Broth (CAMHB) for 24 hours at 37° C. Post challenge, samples were rinsed and sonicated in Dey/Engley (D/E) broth. Sonicates were serially diluted and plated to determine the number of bacteria adhered to the test articles. Uncoated ETTs were used as controls.

As shown in Table 10.2, the ET-008B coating prevented colonization of ETT surfaces with all studied bacteria over a period of 4 weeks.

TABLE 10.2

Efficacy of ASP-1 coating (lot ET-008B) in preventing ETT surface colonization with bacteria.

|  |  | pre-incubation period: | | | |
| --- | --- | --- | --- | --- | --- |
|  | ETT type | 1 wk | 2 wks | 3 wks | 4 wks |
|  |  | Bacteria recovered from ETT, log (CFU/mL) | | | |
| *P. aeruginosa* (ATCC 27318) | coated ET-008B | 0 | 0 | 0 | 0 |
|  | uncoated controls | 4.5 ± 0.2 | 4.2 ± 0.4 | 3.7 ± 0.2 | 3.9 ± 0.2 |
| MRSA (ATCC 700698) | coated ET-008B | 0 | 0 | 0 | 0 |
|  | uncoated controls | 4.7 ± 0.3 | 5.1 ± 0.2 | 4.6 ± 0.2 | 4.3 ± 0.4 |
| *A. baumannii* (ATCC BAA-1605) | coated ET-008B | 0 | 0 | 0 | 0 |
|  | uncoated controls | 4.5 ± 0.5 | 3.6 ± 0.6 | 5.0 ± 0.2 | 5.4 ± 0.2 |

Example 11

Two gels with identical compositions comprising chitosan (CS320) (MW=320 kDa, DDA=95%, Primex), acetic acid, sodium hydroxide, propylene glycol and water were loaded with ASP-2 antimicrobial peptides (WR-12, SEQ ID NO: 14 in Table A), with the first ASP-2 peptide in L-form (all amino acids in L-isoform, gel lot #WD-115G, Table 11.1) and the second ASP-2D in D-form (all amino acids in D-isoform, gel lot #WD-119A, Table 11.2).

TABLE 11.1

Composition of gel lot# WD-115G with ASP-2 antimicrobial peptide in L- form (all amino acids in L-isomeric form).

|  | wt % in gel | p, mEq/g component | P, mEq/ 100 g gel |
| --- | --- | --- | --- |
| ASP-2 (L-form) | 1.33 | +2.9 | +3.9 |
| CS320 (DDA = 95%) | 1.33 | +5.8 | +7.8 |
| Acetic acid | 0.43 | +16.7 | +7.1 |
| NaOH | 0.13 | −25.0 | −3.3 |
| Propylene glycol | 16.03 | 0.0 |  |
| Water | 80.75 | 0.0 |  |
| Total | 100.00 | Matrix P: | +11.5 |

TABLE 11.2

Composition of gel lot# WD-119A with ASP-2D antimicrobial peptide in D- form (all amino acids in D-isomeric form).

|  | wt % in gel | p, mEq/g component | P, mEq/100 g gel |
| --- | --- | --- | --- |
| ASP-2D (D-form) | 1.33 | +2.9 | +3.9 |
| CS320 (DDA = 95%) | 1.33 | +5.8 | +7.8 |
| Acetic acid | 0.43 | +16.7 | +7.1 |
| NaOH | 0.13 | −25.0 | −3.3 |
| Propylene glycol | 16.03 | 0.0 |  |
| Water | 80.75 | 0.0 |  |
| Total | 100.00 | Matrix P: | +11.5 |

Anti-microbial efficacy of the ASP-2 and ASP-2D gels was tested using an ex-vivo pig skin model infected with methicillin-resistant *Staphylococcus aureus* (MRSA USA 300, ATCC BAA-1717). Dermal/epidermal pig skin layer sheets L5 mm thick were punched into 9 mm discs. The pig skin discs were inoculated with MRSA culture grown overnight at 3'7° C. in Cation Adjusted Mueller Hinton Broth (CAMHB) and diluted with the broth to 10^6 CFU/mL. The inoculated pig skin discs were incubated to allow development of mature MRSA biofilm over 72 hours at 37° C. The pig skin discs with biofilms were placed in 48-well plates containing 0.15 mL of 10% porcine serum in saline (PSS) and then challenged with 0.2 mL of gels for 1, 2 or 3 days at 37° C. Post challenge, samples were rinsed with 1 mL phosphate buffered saline (PBS) and sonicated twice in 1 mL Dey/Engley (D/E) broth for 15 min. The first sonicates were discarded and the second sonicates in fresh 1 mL D/E broth were serially diluted in PBS and plated on agar plates to obtain bacteria counts recovered from skin samples. The gels were compared to commercial chitosan silver wound dressing (Medline Opticell AG Plus Silver Antibacterial Gelling Fiber Wound Dressing) soaked in 0.2 mL saline, and positive growth controls comprising samples treated with 0.2 mL saline. In all cases three replicas per group were tested. Results of the study are shown in Table 11.3 and indicate that both gels, ASP-2L (lot #WD-115G) and ASP-2D (lot #WD-119A), were more efficient in eradicating MRSA from pig skin than the Opticell Ag+ gelling dressing.

TABLE 11.3

Eradication of 72 hrs mature MRSA biofilms on pig skin by ASP-2 gel (lot# WD-115G), ASP-2D gel (lot# WD-119A) and Opticell Ag+ silver dressing.

| | Pig skin treatment period: | | |
|---|---|---|---|
| | 1 day | 2 days | 3 days |
| | Bacteria recovered from skin (n = 3/group) | | |
| Treatment group: | log(CFU/mL) | log(CFU/mL) | log(CFU/mL) |
| Saline control | 7.0 ± 0.3 | 7.0 ± 0.2 | 6.6 ± 0.1 |
| Gel # WD-115G (ASP-2L) | 3.7 ± 0.5 | 2.9 ± 1.0 | 1.4 ± 1.3 |
| Gel# WD-119A (ASP-2D) | 3.2 ± 0.6 | 2.3 ± 2.0 | 0 |
| Opticell Ag+ | 6.4 ± 0.1 | 6.1 ± 0.2 | 5.9 ± 0.6 |

Example 12

Four gels were prepared with compositions shown in Table 12.1 comprising cationic ASP-2 antimicrobial peptide in L-form (WR-12, SEQ ID NO: 14 in Table A, all amino acids in L-isoform), cationic polymer chitosan (CS320) (MW=320 kDa, DDA=95%, Primex), acetic acid—a donor of positively charged proton ions (H+), sodium hydroxide or tromethamine—an acceptor of proton ions (H+), one or more neutral low molecular weight hydrophilic excipients: propylene glycol, panthenol, methylparaben, and water.

TABLE 12.1

Compositions of gels with ASP-2 antimicrobial peptide.

| | GEL lot ID# | | | |
|---|---|---|---|---|
| | WD-115G | WD-120H-5 | WD-120H-6 | WD-120T-2 |
| CCS320 | 1.33 | 1.33 | 1.33 | 1.33 |
| Acetic acid | 0.43 | 0.43 | 0.43 | 0.43 |
| Sodium hydroxide | 0.13 | 0.13 | 0.13 | |
| Tromethamine | | | | 0.45 |
| Propylene glycol | 16.03 | 15.78 | 10.88 | 10.88 |
| Methylparaben | | 0.29 | 0.29 | 0.29 |
| Panthenol | | | 4.80 | 4.80 |
| ASP-2 (L-form) | 1.33 | 1.33 | 1.33 | 1.33 |
| Water | 80.75 | 80.70 | 80.81 | 80.49 |

Anti-microbial efficacy of the ASP-2 gels was tested using an ex-vivo pig skin model infected with methicillin-resistant *Staphylococcus aureus* (MRSA USA 300, ATCC BAA-1717). Dermal/epidermal pig skin layer sheets 1.5 mm thick were punched into 9 mm discs. The pig skin discs were inoculated with MRSA culture grown overnight at 37° C. in Cation Adjusted Mueller Hinton Broth (CAMHB) and diluted with the broth to 10^6 CFU/mL. The inoculated pig skin samples were incubated to allow development of MRSA biofilms over 72 hours at 37° C. The pig skin discs with biofilms were placed in 48-well plates containing 0.15 mL of 10% porcine serum in saline (PSS) and then challenged with 0.15 mL of gels for 1, 2 or 3 days at 37° C. Post challenge, samples were rinsed with 1 mL phosphate buffered saline (PBS) and sonicated twice in 1 mL Dey/Engley (D/E) broth for 15 min. The first sonicates were discarded and the second sonicates in fresh 1 mL D/E broth were serially diluted in PBS and plated on agar plates to determine the number of bacteria recovered from skin samples. The gels were compared with 0.15 mL commercial Silver Sulfadiazine (SSD) cream (Ascend Laboratories) and positive growth controls comprising samples treated with 0.15 mL saline. In all cases three replicas per group were tested. Results of the study are shown in Table 12.2 and indicate that all ASP-2L gels were more efficient in eradicating MRSA from pig skin than the SSD cream.

TABLE 12.2

Eradication of 72 hrs mature MRSA biofilms on pig skin by ASP-2 gels with compositions shown in Table 12.1 and SSD cream.

| | Pig skin treatment period: | | |
|---|---|---|---|
| | 1 day | 2 days | 3 days |
| | Bacteria recovered | | |
| treatment group: | log(CFU/mL) | log(CFU/mL) | log(CFU/mL) |
| Saline control | 6.6 ± 0.3 | 6.2 ± 0.2 | 5.7 ± 0.3 |
| WD-115G | 1.0 ± 1.7 | 0 | 0.8 ± 1.3 |
| WD-120H-5 | 1.4 ± 1.3 | 0 | 0.6 ± 1.0 |
| WD-120H-6 | 0.9 ± 1.5 | 0 | 0 |
| WD-120T-2 | 1.1 ± 1.0 | 1.6 ± 1.4 | 0 |
| SSD cream | 3.7 ± 0.5 | 3.3 ± 0.4 | 3.6 ± 0.3 |

The present invention has been discussed in considerable detail with reference to certain preferred embodiments and the examples described herein. However, other embodiments are possible. Therefore, the scope of the appended claims should not be limited to the description of preferred embodiments contained herein.

What is claimed is:

1. A Delivery System for delivery of an Active Component, the Delivery System comprising:
   a) a Delivery Matrix comprising an excess of positive charge density P, and comprising one or more components selected from the group consisting of: (i) a Cationic Component, comprising a cationic polymer, a cationic copolymer, and a non-polymeric compound or composition having a positively charged moiety; and (ii) a Matrix Forming Substance, wherein
      (x) at least one of the components of the Delivery Matrix is matrix forming and comprises: one of the said Cationic Components, which is itself matrix forming; or said Matrix Forming Substance; and
      (y) at least one of the components in the Delivery Matrix is one of the said Cationic Components; and
   b) an Active Component comprising at least one bioactive cationic compound or composition, wherein the Active Component comprises an excess positive charge density P,
   wherein the Delivery Matrix has a mEq amount of positive charge density P which is equal to or exceeds the mEq amount of positive charge density P of the Active Component, and
   wherein the form of the Delivery Matrix is a form suitable for incorporating the Active Component into the Delivery Matrix in a non-covalently bound form for delivery of the Active Component from the Delivery System, and
   wherein the charge density $P=\Sigma(\omega*\rho)_n$, where $\omega$=wt fraction of the component, $\rho$ is the charge density of the component per unit of mass, and n is the number of components.

2. The Delivery System of claim 1, wherein the Cationic Component comprises two or more positively charged compounds or compositions selected from the group consisting of: (i) the cationic polymer or copolymer, and (ii) the non-polymeric compound or composition having a positively charged moiety.

3. The Delivery System of claim 1, wherein at least one of the Cationic Components comprises a cationic polymer or co-polymer selected from the group consisting of: chitosan, chemically modified chitosan, poly (butyl methacrylate-co-(2-demethylaminoeethyl) methacrylate-co-methyl methacrylate), polyhexamethylene biguanide, polylysine, and polyamine.

4. The Delivery System of claim 1, wherein at least one of the Cationic Components is a positively charged naturally occurring biopolymer, positively charged naturally occurring matrix polymer, or a positively charged naturally occurring large molecule.

5. The Delivery System of claim 1, wherein at least one of the Cationic Components comprises a compound selected from the group consisting of: amine, alkyl-amine, a quaternary ammonium, benzethonium, benzalkonium, cetalkonium stearalkonium, cetyltrimethylammonium, thonzonium, domiphen, lysine, arginine, histidine, allantoin, guanidine, guanidinium, biguanide, and histamine.

6. The Delivery System of claim 1, wherein at least one of the Cationic Components comprises a compound or compounds having a 5- or 6-membered aromatic or non-aromatic ring with a positively charged moiety selected from the group consisting of: cetylpyridinium, pyridine, piperidine, morpholine, imidazole, diazole, and triazole.

7. The Delivery System of claim 1, wherein at least one of the Cationic Components is a-non-polymeric compound or composition having a positively charged moiety.

8. The Delivery System of claim 7, wherein the non-polymeric compound or composition having a a is an acid selected from the group consisting of hydrochloric, sulfuric, methanesulfonic, isethionic, phosphoric, acetic, tartaric, lactic, malic, oxalic, succinic, adipic, citric, ethylenediaminetetraacetic acid, benzoic, benzenesulfonic, tosylic, fumaric, glucoheptonic, pentetic, stearic, palmitic, myristic, lauric, capric, and linoleic.

9. The Delivery System of claim 1, wherein at least one of the Cationic Components comprises a cationic polymer or copolymer with concentration (density) of positive charge which is ≥1 mEq/g material.

10. The Delivery System of claim 1, wherein the Matrix Forming Substance comprises one or more matrix forming compounds that, in combination, do not reduce mEq amount of positive charge presented by the Delivery Matrix below the mEq amount of positive charge presented by the Active Component in the Delivery System.

11. The Delivery System of claim 1, wherein the Matrix Forming Substance is one or more compounds selected from the group consisting of: a neutrally charged matrix forming large molecule, polymer or copolymer, a non-ionic matrix forming large molecule, polymer or copolymer, and a low molecular weight hydrophilic matrix forming compound.

12. The Delivery System of claim 1, wherein at least one compound comprising the Matrix Forming Substance is selected from the group consisting of: hydroxypropyl cellulose (HPC), hydroxyethyl cellulose (HEC), hydroxypropyl methyl cellulose (HPMC), ethyl cellulose (EC), starch, hydroxyethyl starch, tetrastarch, hetastarch, dextran, polyvinyl pyrrolidone, polyurethane, polyvinyl alcohol.

13. The Delivery System of claim 1, wherein at least one compound comprising the Matrix Forming Substance is polyurethane.

14. The Delivery System of claim 1, wherein at least one compound comprising the Matrix Forming Substance comprises an acceptor of proton ions (H+) in amounts that do not reduce mEq amount of excess positive charge donated by the Delivery Matrix below the mEq amount of positive charge presented by the Active Component in the Delivery System.

15. The Delivery System of claim 1, wherein the acceptor of proton ions (H+) of claim 14 comprises a basic compound selected from: sodium hydroxide, potassium hydroxide, ammoniahydroxide, magnesium hydroxide, calcium hydroxide, tromethamine, trolamine, diisopropanolamine, diethanolamine, and mixtures thereof.

16. The Delivery System of claim 1, wherein at least one compound comprising the Matrix Forming Substance is an amphiphilic compound that does not reduce mEq amount of positive charge presented by the Delivery Matrix below the mEq amount of positive charge presented by the Active Component in the Delivery System.

17. The Delivery System of claim 16, wherein the amphiphilic compound is non-ionic amphiphilic compound selected from the group consisting of: polyoxyethylene-polyoxypropylene block copolymer, polyoxyl castor oil, polyoxyl hydrogenated castor oil, polyoxyl stearate, polyoxyl 15 hydroxystearate, polyoxyl cetostearyl ether, and polyoxyethylene sorbitan fatty acid esters.

18. The Delivery System of claim 1, wherein the Delivery System is in a liquid form with viscosity<500 cPs.

19. The Delivery System of claim 1, wherein the Delivery System is in a gel form with viscosity>500 cPs.

20. The Delivery System of claim 1, wherein the Delivery System is one of: (i) a solid form obtained by removing liquids from the delivery system, the delivery system being originally formed in a liquid form or a gel form; (ii) a solid form obtained by lyophilizing the delivery system, the delivery system being originally formed in a liquid form or a gel form, (iii) a solid form obtained by drying from a solvent; or (iv) a solid form obtained by impregnating a solid Delivery Matrix with a liquid composition from a solvent, following by drying the solvent from the matrix.

21. The Delivery System of claim 20, wherein the Delivery System is (iii) a solid form obtained by drying from a solvent, and the solvent is selected from the group consisting of: water, methanol, ethanol, propanol, isopropanol, butanol, isobutanol, acetone, methyl ethyl ketone, methyl isobutyl ketone, methyl acetate, ethyl acetate, propyl acetate, isopropyl acetate, butyl acetate, isobutyl acetate, ethyl formate, tert-butylmethyl ether, tetrahydrofuran, ethyl ether, glycofurol, heptane, pentane, acetonitrile and mixtures thereof.

22. The Delivery System of claim 1, wherein the Active Component has at least one molecule comprising positively charged moieties at density higher than 0.5 mEq/g, higher than 1 mEq/g, preferably higher than 2 mEq/g, more preferably higher than 3 mEq/g, and most preferably higher than 4 mEq/g of the Active Component material.

23. The Delivery System of claim 1, wherein the Active Component comprises at least one cationic antimicrobial peptide.

24. The Delivery System of claim 1, wherein the Active Component comprises one of cationic antimicrobial peptides selected from the group consisting of:

RVVRVVRRVVRR, (SEQ ID NO: 4)

RRVVRRVRRVVRRVVRVVRRVVRR, (SEQ ID NO: 5)

VRRVVRRVVRVVRRVVRRVRRVVRRVVRRVVRR, (SEQ ID NO: 6)

RRVVRRVRRVVRRVVRVVRRVVRRVRRVVRRVVRRVVRR, (SEQ ID NO: 7)

RVVRVVRRVVRRVRRVVRRVVRVVRRVVRRVRRVVRRVVRVVRRVVRR, (SEQ ID NO: 8)

RVVRVVRRWVRR, (SEQ ID NO: 9)

RRWVRRVRRVWRRVVRVVRRWVRR, (SEQ ID NO: 10)

VRRVWRRVVRVVRRWVRRVRRVWRRVVRVVRRWVRR, (SEQ ID NO: 11)

RVVRVVRRWVRRVRRVWRRVVRVVRRWVRRVRRVWRRVVRVVRRWVRR, (SEQ ID NO: 12)

RRWWRR, (SEQ ID NO: 13)

RWWRWWRRWWRR, (SEQ ID NO: 14)

WRRWWRRWWRWWRRWWRR, (SEQ ID NO: 15)

RRWWRRWRRWRRWWRWWRRWWRR, and (SEQ ID NO: 16)

RRWVRRVRRWVRRVVRVVRRWVRR. (SEQ ID NO: 17)

25. The Delivery System of claim 1, wherein the Active Component comprises one of the cationic antimicrobial peptides:

RRWVRRVRRVWRRVVRVVRRWVRR, (SEQ ID NO: 10)

RWWRWWRRWWRR, or (SEQ ID NO: 14)

RRWVRRVRRWVRRVVRVVRRWVRR. (SEQ ID NO: 17)

26. The Delivery System of claim 1, wherein the Active Component comprises an amphiphilic cationic mimetic of peptide.

27. The Delivery System of claim 1, wherein the Active Component comprises more than one bioactive cationic moiety.

28. The Delivery System of claim 1, wherein the Active Component comprises an antimicrobial.

29. The Delivery System of claim 1, wherein the Active Component comprises more than one cationic antimicrobial selected from the group consisting of: antimicrobial peptides, mimetics of antimicrobial peptides, quaternary ammonium compounds, biguanides, and polybiguanides.

30. A Delivery System for delivery of an Active Component to a body, the Delivery System comprising:
  a) a Delivery Matrix comprising a composition having an excess of positive charge density P, the composition comprising chitosan; and
  b) an Active Component comprising at least one bioactive cationic compound or composition, wherein the Active Component comprises an excess of positive charge density P,
  wherein the Delivery Matrix has a mEq amount of positive charge density P which is equal to or exceeds the mEq amount of positive charge density P of the Active Component, and
  wherein the Delivery Matrix comprises a form suitable for incorporating the Active Component into the Delivery Matrix in a non-covalently bound form for delivery of the Active Component from the Delivery System, and
  wherein the charge density $P=\Sigma(\omega*\rho)_n$, where $\omega$=wt fraction of the component, $\rho$ is the charge density of the component per unit of mass, and n is the number of components.

31. The Delivery System of claim 1 wherein the Delivery System is a liquid, gel or foam applied to a bandage for application to the body, or a solid, liquid, gel or foam used for a surgical application and delivered directly to the body.

32. A Delivery System for delivery of an Active Component to a body, the Delivery System comprising:
  a) a Delivery Matrix comprising a non-polymeric molecule having a positive charge density P; and a polyurethane-comprising Matrix Forming Substance; and
  b) an Active Component comprising at least one bioactive cationic compound or composition, wherein the Active Component comprises an excess positive charge density P,
  wherein the Delivery Matrix has a mEq amount of positive charge density P which is equal to or exceeds the mEq amount of positive charge density P of the Active Component, and
  wherein the Delivery System is applied to a medical device for delivery of the Active component to the body, and
  wherein the Delivery Matrix comprises a form suitable for incorporating the Active Component into the Delivery Matrix in a non-covalently bound form for delivery of the Active Component from the Delivery System, and
  wherein the charge density $P=\Sigma(\omega*\rho)_n$, where $\omega$=wt fraction of the component, $\rho$ is the charge density of the component per unit of mass, and n is the number of components.

33. The Delivery System according to claim 1 wherein the Delivery Matrix comprises an excess of positive charge at a charge density of greater than or equal to 1 mEq/g of the Delivery Matrix.

34. The Delivery System according to claim 1 wherein the Active Component comprises an excess of positive charge at a charge density of greater than or equal to 1 mEq/g of the Active Component.

35. The Delivery System according to claim 1 wherein at least 50% of the bioactive cationic compound is released from the Delivery System over a period of 7 days.

* * * * *